United States Patent
Yamaguchi

(10) Patent No.: US 11,473,987 B2
(45) Date of Patent: *Oct. 18, 2022

(54) SENSOR CHIP AND FORCE SENSOR DEVICE

(71) Applicant: MINEBEA MITSUMI Inc., Nagano (JP)

(72) Inventor: Shinya Yamaguchi, Tokyo (JP)

(73) Assignee: MINEBEA MITSUMI Inc., Nagano (JP)

(*) Notice: Subject to any disclaimer, the term of this patent is extended or adjusted under 35 U.S.C. 154(b) by 148 days.

This patent is subject to a terminal disclaimer.

(21) Appl. No.: 16/965,107

(22) PCT Filed: Jan. 24, 2019

(86) PCT No.: PCT/JP2019/002259
§ 371 (c)(1),
(2) Date: Jul. 27, 2020

(87) PCT Pub. No.: WO2019/146695
PCT Pub. Date: Aug. 1, 2019

(65) Prior Publication Data
US 2021/0033475 A1 Feb. 4, 2021

(30) Foreign Application Priority Data

Jan. 29, 2018 (JP) .............................. JP2018-012923

(51) Int. Cl.
*G01L 1/00* (2006.01)
*G01L 1/18* (2006.01)
*G01L 1/22* (2006.01)

(52) U.S. Cl.
CPC .............. *G01L 1/18* (2013.01); *G01L 1/2206* (2013.01); *G01L 1/2287* (2013.01)

(58) Field of Classification Search
CPC ........ G01L 1/18; G01L 1/2206; G01L 1/2287
See application file for complete search history.

(56) References Cited

U.S. PATENT DOCUMENTS 4,849,730 A 7/1989 Izumi et al.
4,951,510 A 8/1990 Holm-Kennedy et al.
(Continued)

FOREIGN PATENT DOCUMENTS

EP 1327870 7/2003
EP 3404390 11/2018
(Continued)

OTHER PUBLICATIONS

Extended European Search Report dated Feb. 23, 2021 (EP Patent Application No. 19743214.9).
(Continued)

*Primary Examiner* — Max H Noori
(74) *Attorney, Agent, or Firm* — IPUSA, PLLC

(57) ABSTRACT

A sensor chip includes a substrate, first supporting portions, a second supporting portion around which the first support portions are disposed, the second supporting portion being disposed at a center of the substrate, first detecting beams each connecting the first supporting portions, which are mutually adjacent, second detecting beams disposed in parallel with the first detecting beams between the first detecting beams and the second supporting portion, force points disposed in the first detecting beams so as to be applied with force, and a plurality of strain detecting elements disposed a predetermined positions of the first detecting beams and the second detecting beams, wherein the plurality of strain detecting elements includes a first detecting portion having a strain detecting element capable of detecting force in a first direction, and a second detecting (Continued)

portion having a strain detecting element disposed at a position symmetric relative to the first detecting portion.

11 Claims, 15 Drawing Sheets

(56) References Cited

U.S. PATENT DOCUMENTS

| | | | |
|---|---|---|---|
| 5,526,700 | A | 6/1996 | Akeel |
| 6,555,767 | B1* | 4/2003 | Lockery ................ G01L 1/2206 177/229 |
| 6,823,744 | B2 | 11/2004 | Ohsato et al. |
| 7,536,922 | B2 | 5/2009 | Sakurai et al. |
| 7,594,445 | B2 | 9/2009 | Hirabayashi et al. |
| 8,196,477 | B2 | 6/2012 | Ohsato et al. |
| 2003/0140713 | A1 | 7/2003 | Ohsato et al. |
| 2004/0045372 | A1 | 3/2004 | Liu et al. |
| 2008/0053247 | A1* | 3/2008 | Sakurai ................ G01L 1/205 73/862.041 |
| 2010/0037692 | A1* | 2/2010 | Dube ................ G01P 15/0915 73/504.16 |
| 2011/0239784 | A1* | 10/2011 | Ohsato ................ G01P 15/123 73/514.33 |
| 2018/0313866 | A1* | 11/2018 | Yamaguchi ............. G01P 15/18 |
| 2019/0187009 | A1 | 6/2019 | Yamaguchi |

FOREIGN PATENT DOCUMENTS

| | | |
|---|---|---|
| JP | 2003-207405 | 7/2003 |
| JP | 4011345 | 11/2007 |
| JP | 2008-058106 | 3/2008 |
| JP | 2013-002942 | 1/2013 |
| KR | 10-2014-0007170 | 1/2014 |
| WO | 2018066557 | 4/2018 |

OTHER PUBLICATIONS

International Search Report for PCT/JP2019/002259 dated Feb. 19, 2019.
Office Action dated Feb. 24, 2022 with respect to the corresponding European patent application No. 19743214.9.
Office Action dated Apr. 5, 2019 with respect to the related U.S. Appl. No. 15/958,373.
Final Action dated Oct. 17, 2019 with respect to the related U.S. Appl. No. 15/958,373.
Partial Search Report dated Oct. 1, 2018 with respect to the related European patent application No. 18168812.8.

* cited by examiner (a)

(b)

(a)

(b)

(a)

(b)

(a)

(b)

(a)

(b)

(a)

(b)

(a)

(b)

SENSOR CHIP AND FORCE SENSOR DEVICE

TECHNICAL FIELD

The present invention relates to a sensor chip and a force sensor device.

BACKGROUND ART

Conventionally, a force sensor device has been known in which a plurality of strain gauges is applied to a strain generator made from a metal, and a strain caused when an external force is applied is converted into an electric signal, thereby detecting a multi-axis direction force. However, this force sensor device has problems in accuracy and productivity because it is necessary to attach strain gauges one by one manually, and it is difficult to downsize the device due to its structure.

On the other hand, a force sensor device has been proposed in which a strain gauge is replaced with a MEMS sensor chip for a strain detection to solve a problem of lamination accuracy and to achieve miniaturization (see, for example, PTL 1).

CITATION LIST

Patent Literature

[PTL 1]
Japanese Patent No. 4011345

SUMMARY OF INVENTION

Problem to be Solved by the Invention

However, in the above-described conventional MEMS force sensor device using the sensor chip, if the input is a single axis (in the direction along any one of six axes [Fx, Fy, Fz, Mx, My, Mz]), the force sensor can perform a high accuracy.

However, when the input is a composite input (when the input is a composite input along any two or more of the six axes [Fx, Fy, Fz, Mx, My, Mz]), an error of the force sensor is increased due to an insufficient axial separation property, and the accuracy is reduced. In particular, in the case of the composite input, there are combinations of axes of the composite input that does not satisfy an accuracy target value.

The present invention has been made in view of the above, and is intended to improve the axial separation property and a sensor accuracy for the composite input of the sensor chip.

Means for Solving Problems

The present sensor chip (110) includes a substrate, first supporting portions (111a, 111b, 111c, 111d), a second supporting portion (111e) around which the first support portions are disposed, the second supporting portion being disposed at a center of the substrate, first detecting beams (113a, 113d, 113g, 113j) each connecting the first supporting portions, which are mutually adjacent, second detecting beams (113b, 113e, 113h, 113k) disposed in parallel with the first detecting beams between the first detecting beams and the second supporting portion, force points (114a, 114b, 114c, 114d) disposed in the first detecting beams so as to be applied with force, and a plurality of strain detecting elements disposed a predetermined positions of the first detecting beams and the second detecting beams, wherein the plurality of strain detecting elements includes a first detecting portion having a strain detecting element capable of detecting force in a first direction, and a second detecting portion having a strain detecting element disposed at a position symmetric relative to the first detecting portion.

The reference numerals in parentheses are appended for ease of understanding and are merely an example and are not limited to the illustrated embodiment.

Effects of the Invention

The disclosed technique can improve an axial separation property and a sensor accuracy for a composite input of a sensor chip.

DESCRIPTION OF EMBODIMENTS

Figure 1:
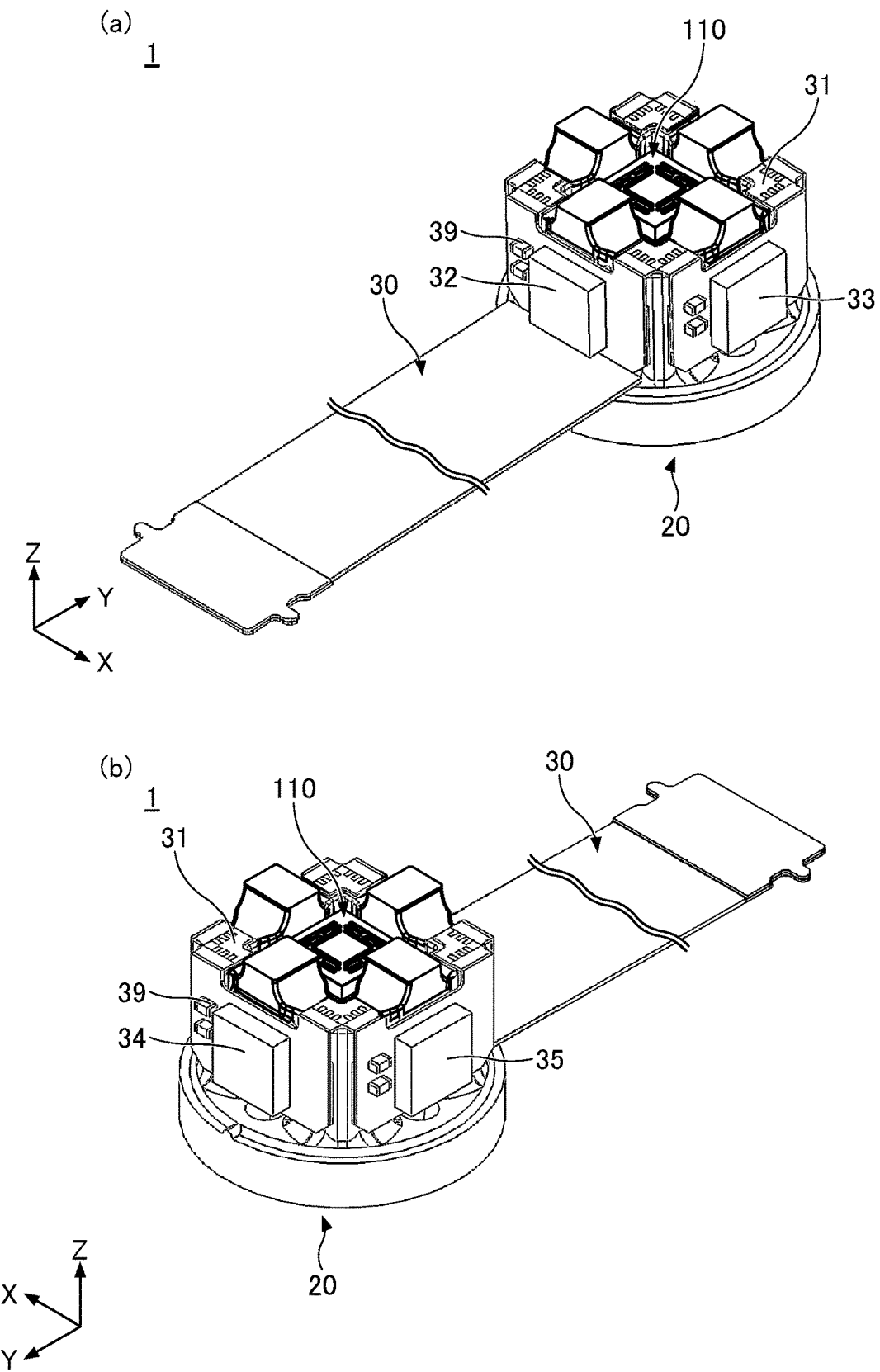
FIG. 1 is a perspective view illustrating an example of a force sensor device according to an embodiment.

Hereinafter, an embodiment for carrying out the invention with reference to the drawings will be described. In each drawing, the same components are indicated by the same reference numerals and overlapping descriptions may be omitted.

Schematic Structure of a Force Sensor Device 1

Figure 2:
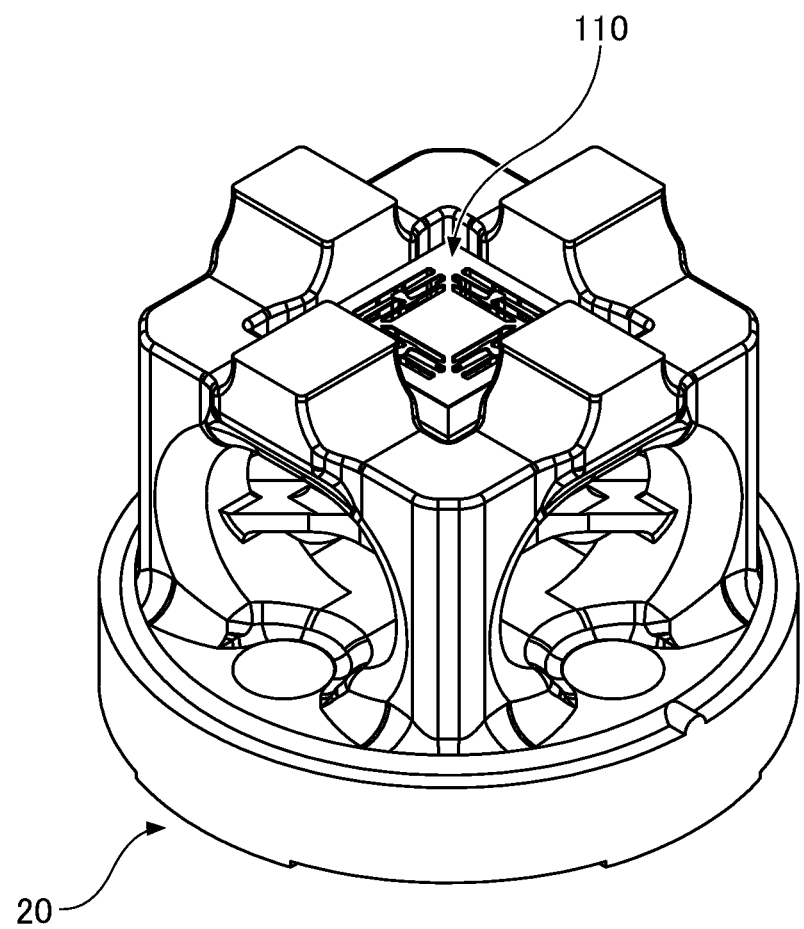
FIG. 2 is a perspective view illustrating an example of a sensor chip and a strain generator of a force sensor device according to the embodiment.
Figure 2:
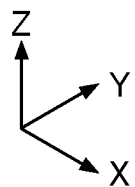

FIG. 1 is perspective views illustrating a force sensor device according to a first embodiment. FIG. 2 is a perspective view illustrating a sensor chip and a strain generator of a force sensor device according to a first embodiment. Referring to FIGS. 1 and 2, the force sensor device 1 includes a sensor chip 110, a strain generator 20, and an input/output board 30. The force sensor device 1 is, for example, a multi-axis force sensor device mounted on an arm or a finger of a robot used for a machine tool or the like.

The sensor chip 110 has function of detecting a displacement along predetermined axial directions of up to six axes. The strain generator 20 has the function of transferring applied force to the sensor chip 110.

The sensor chip 110 is bonded to the upper surface side of the strain generator 20 so as not to protrude from the strain generator 20. Also, one end side of the input/output board 30 for providing an input/output signals to and from the sensor chip 110 is appropriately bent on the upper surface and each side of the strain generator 20. Each electrode 31 of the sensor chip 110 and the input/output board 30 is electrically connected by a bonding wire (not illustrated) or the like.

In the input/output board 30, an active component 32 and a passive component 39 are mounted in a region disposed on the first side of the strain generator 20.

In the input/output board 30, an active component 33 and a passive component 39 are mounted in a region disposed on the second side of the strain generator 20. In the input/output board 30, an active component 34 and the passive component 39 are mounted in a region disposed on the third side of the strain generator 20. In the input/output board 30, the active component 35 and the passive component 39 are mounted in a region disposed on the fourth side of the strain generator 20. The active component 33 is, for example, an IC (AD converter) that converts an analog electric signal from a bridge circuit that detects an X-axis direction force Fx output from the sensor chip 110 and an analog electric signal from a bridge circuit that detects a Y-axis direction force Fy output from the sensor chip 110 into a digital electric signal.

The active component 34 is, for example, an IC (AD converter) that converts an analog electric signal from a bridge circuit that detects a Z-axis direction force Fz output from the sensor chip 110 and an analog electric signal from a bridge circuit that detects a moment Mx that rotates around the X-axis output from the sensor chip 110 as an axis to a digital electric signal.

The active component 35 is, for example, an IC (AD converter) that converts an analog electric signal from a bridge circuit that detects a moment My that rotates around the Y-axis as an axis output from the sensor chip 110 and an analog electric signal from a bridge circuit that detects a moment Mz that rotates around the Z-axis as an axis output from the sensor chip 110 into a digital electric signal.

The active component 32 is, for example, an IC that performs predetermined calculation on digital electric signals output from active components 33, 34, and 35 to generate and output signals indicative of forces Fx, Fy, and Fz as well as moments Mx, My, and Mz. A passive component 39 may be a resistor, capacitor, or the like, connected to the active components 32-35.

Incidentally, it is optionally possible to determine how many ICs the functions of the active components 32 to 35 are implemented. The active components 32 to 35 may be mounted on the external circuit side connected to the input/output board 30 without mounting the active components 32 to 35 on the input/output board 30. In this case, an analog electric signal is output from the input/output board 30.

The input/output board 30 is bent to direct an outside below the first side surface of the strain generator 20 and the other end of the input/output board 30 is drawn outwardly. On the other end side of the input/output board 30, a terminal (not illustrated) capable of electrical input/output with an external circuit (such as a control device) connected to the force sensor device 1 is arranged.

In this embodiment, for convenience, in the force sensor device 1, the side on which the sensor chip 110 is provided is an upper side or one side, and the opposite side is a lower side or the other side. The side of each portion of the sensor chip 110 has one or a upper surface, and the other side has the other side or a bottom surface. However, the force sensor device 1 may be used in an inverted state or may be disposed at any angle. A plan view refers to viewing an object from the normal direction (Z-axis direction) of the upper surface of the sensor chip 110, and planar shape refers to viewing an object from the normal direction (Z-axis direction) of the upper surface of the sensor chip 110.

Sensor Chip 110

Figure 3:
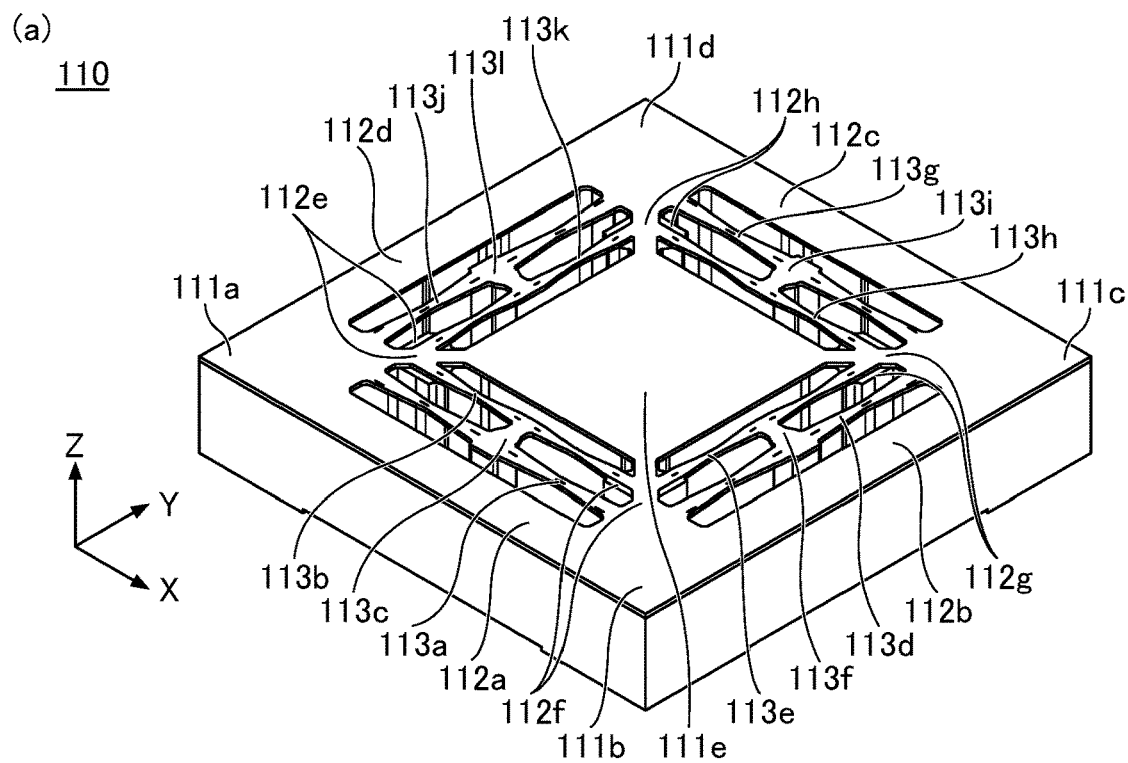
FIG. 3 is a view illustrating from the upper side in the Z-axis direction of an example of the sensor chip according to the embodiment.
Figure 3:
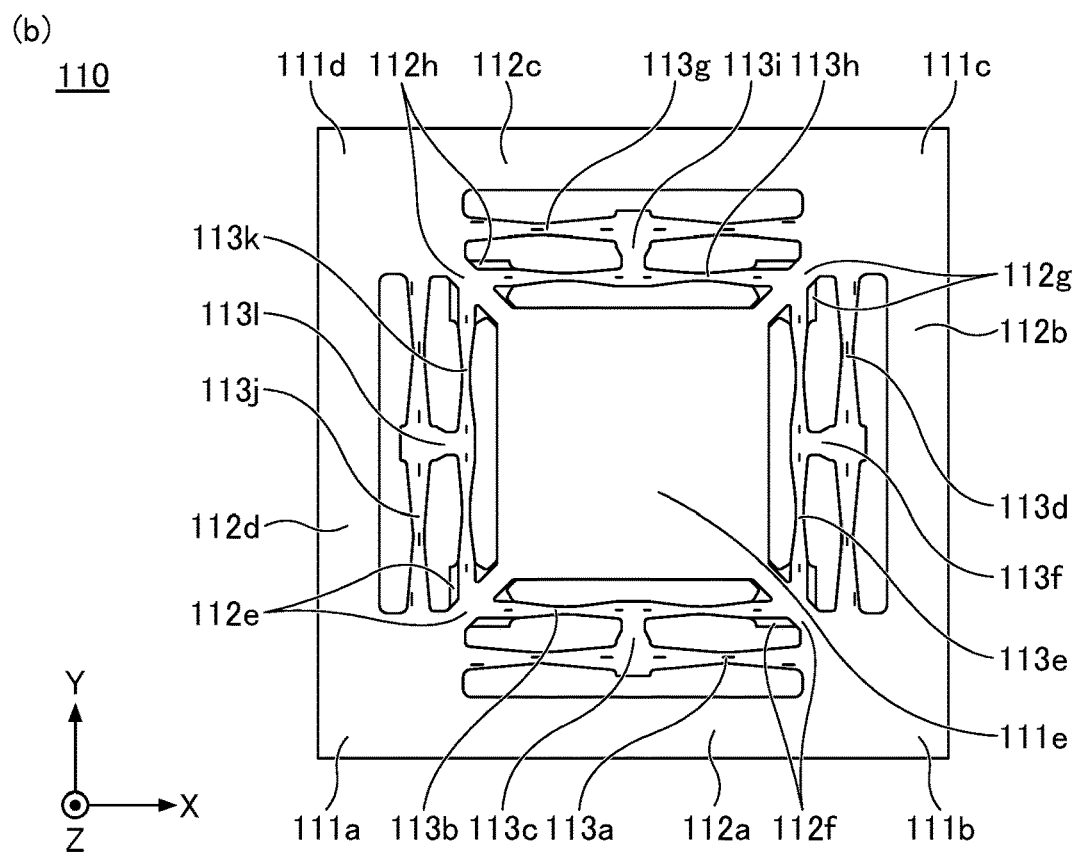
Figure 4:
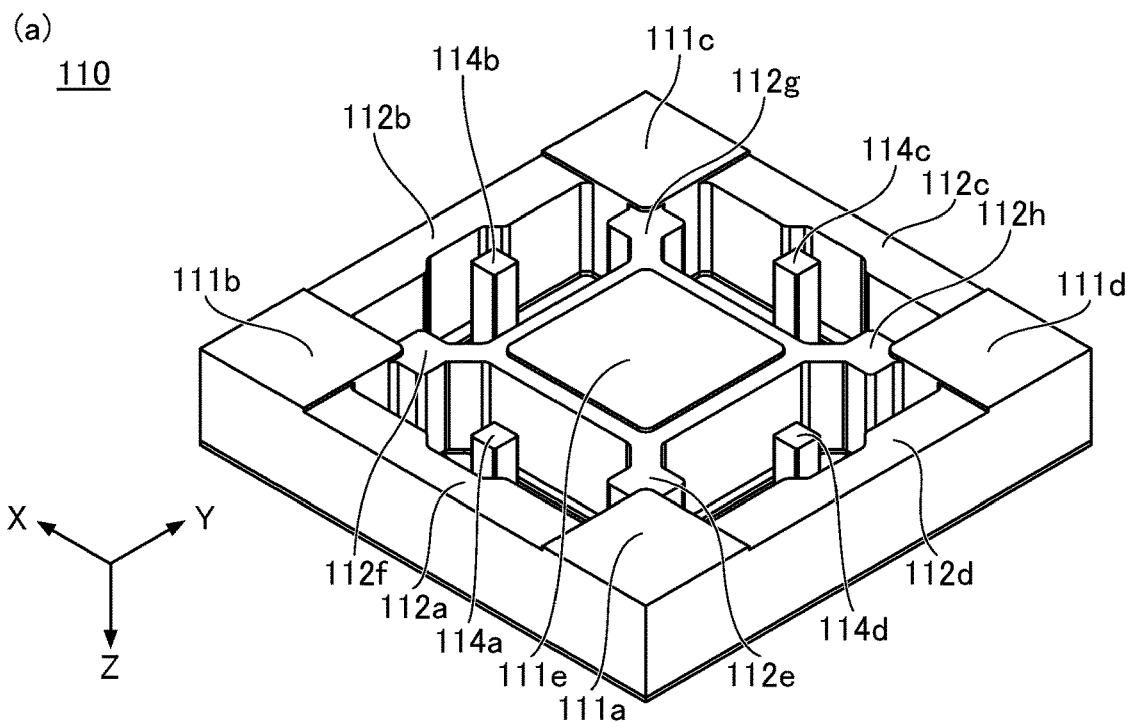
FIG. 4 is a view illustrating from the lower side of the Z-axis direction of an example of the sensor chip according to the embodiment.
Figure 4:
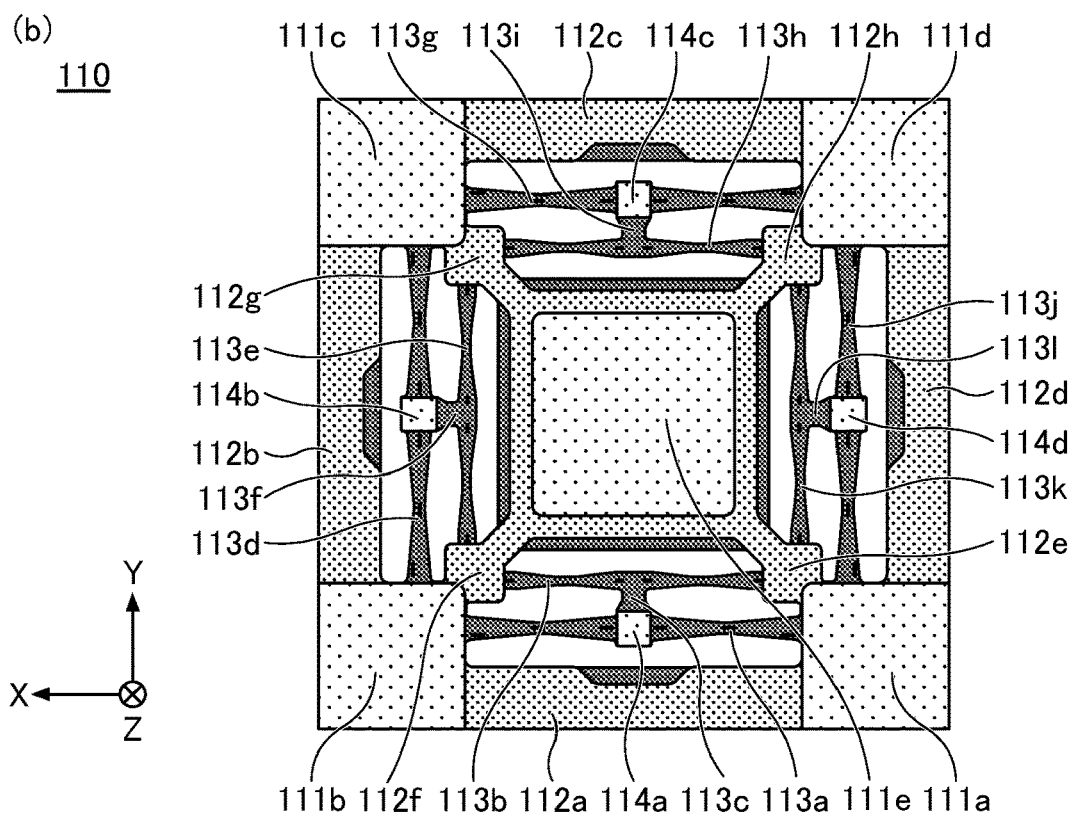

FIG. 3 illustrates the sensor chip 110 viewed from the upper side in the Z-axis direction, in which (a) is a perspective view and (b) is a plan view. FIG. 4 illustrates the sensor chip 110 viewed from the lower side in the Z-axis direction, in which (a) is a perspective view and (b) is a bottom view. In (b) of FIG. 4, for convenience, surfaces of the same height are indicated by the same texture.

The direction parallel to one side of the upper surface of the sensor chip 110 is the X-axis direction, the direction perpendicular to the one side is the Y-axis direction, and the thickness direction (the normal direction of the upper surface of the sensor chip 110) of the sensor chip 110 is the Z-axis direction. The X-axis direction, the Y-axis direction, and the Z-axis direction are orthogonal to one another.

The sensor chip 110 illustrated in FIGS. 3 and 4 is a MEMS (Micro Electro Mechanical Systems) sensor chip capable of detecting up to six axes in one chip and is formed from a semiconductor substrate such as a SOI (Silicon On Insulator) substrate. The planar shape of the sensor chip 110 may be, for example, a square of about 3000 μm square.

The sensor chip 110 includes five columnar supporting portions 111a-111e. The planar shape of the supporting portions 111a-111e may be, for example, a square of about 500 μm. The first supporting portions 111a-111d are disposed at four corners of the sensor chip 110. The supporting portion 111e, which is a second supporting portion, is disposed at the center of the supporting portions 111a-111d.

The support portions 111a-111e may be formed, for example, of an active layer, a BOX layer, and a supporting layer of an SOI substrate, each thickness being, for example, about 500 μm.

Between the supporting portion 111a and the supporting portion 111b, a reinforcing beam 112a is provided to reinforce the structure of the supporting portion 111a and the supporting portion 111b fixed at both ends (connecting adjacent supporting portions). Between the supporting portion 111b and the supporting portion 111c, a reinforcing beam 112b is provided for reinforcing the structure of the supporting portion 111b and the supporting portion 111c (connecting adjacent supporting portions).

Between the supporting portion 111c and the supporting portion 111d, a reinforcing beam 112c is provided for reinforcing the structure (connecting adjacent supporting portions) fixed at both ends to the supporting portion 111c and the supporting portion 111d. Between the supporting portion 111d and the supporting portion 111a, a reinforcing beam 112d is provided for reinforcing the structure of the supporting portion 111d and the supporting portion 111a (connecting adjacent supports to each other).

In other words, the four reinforcing beam 112a, 112b, 112c, and 112d, which are the first reinforcing beam, are formed as frames, and the corners forming the intersections of the respective reinforcing beam are formed as supporting portions 111b, 111c, 111d, and 111a.

The inner corner of the supporting portion 111a and the corner of the supporting portion 111e facing thereto are connected by a reinforcing beam 112e for reinforcing the structure. The inner corner of the supporting portion 111b and the corner of the supporting portion 111e facing thereto are connected by a reinforcing beam 112f for reinforcing the structure.

The inner corner of the supporting portion 111c and the corner of the supporting portion 111e facing thereto are connected by a reinforcing beam 112g for reinforcing the structure. The inner corner of the supporting portion 111d and the corner of the supporting portion 111e facing thereto are connected by a reinforcing beam 112h for reinforcing the structure. The second reinforcing beam, i.e., the reinforcing beam 112e-112h, is disposed diagonally with respect to the X-axis direction (the Y-axis direction). That is, the reinforcing beams 112e-112h are disposed non-parallel to the reinforcing beams 112a, 112b, 112c, and 112d.

The reinforcing beams 112a-112h can be formed, for example, from an active layer, a BOX layer, and a support layer each of an SOI substrate. The thickness (the width in the short-end direction width) of reinforcing beam 112a-112h may be, for example, about 140 μm. The upper surface of each of the reinforcing beam 112a-112h is arranged on the same plane as that of the upper surface of the supporting portion 111a-111e.

In contrast, the lower surfaces respectively of the reinforcing beams 112a-112h are recessed toward the upper surface side by several tens of micrometers from the lower surface of the supporting portions 111a-111e and the lower surfaces of the force points 114a-114d. This is to prevent the lower surfaces of the reinforcing beams 112a-112h from contacting the surface of the strain generator 20 when the sensor chip 110 is bonded to the strain generator 20.

In this manner, the rigidity of the sensor chip 110 in its entirety can be made high by disposing the reinforcing beam, which is formed to be thicker than the detecting beam for detecting distortion, in addition to the detecting beam. As a result, because it is difficult to deform other than the detecting beam in response to an input, good sensor characteristics can be obtained.

Inside the reinforcing beam 112a between the supporting portion 111a and the supporting portion 111b, the detecting beam 113a for detecting the distortion is provided for detecting distortion, both ends of which are fixed to the supporting portion 111a and the supporting portion 111b at predetermined intervals in parallel with the reinforcing beam 112a (connecting adjacent supporting portions to each other).

Between the detecting beam 113a and the supporting portion 111e, the detecting beam 113b is provided in parallel with the detecting beam 113a interposing a predetermined interval with the detecting beam 113a and the supporting portion 111e. The detecting beam 113b connects an end of the reinforcing beam 112e on the side of the supporting portion 111e with an end of the reinforcing beam 112f on the side of the supporting portion 111e.

The generally central longitudinal portion of the detecting beam 113a and the longitudinally central portion of the opposing detecting beam 113b are coupled by a detecting beam 113c positioned perpendicular to the detecting beam 113a and the detecting beam 113b.

Inside the reinforcing beam 112b between the supporting portion 111b and the supporting portion 111c, a detecting beam 113d is disposed for detecting distortion (mutually connecting adjacent supporting portions). Both ends of the detecting beam 113d are respectively fixed to the supporting portion 111b and the supporting portion 111c in parallel with the reinforcing beam 112b while interposing a predetermined interval.

Between the detecting beam 113d and the supporting portion 111e, a detecting beam 113e is disposed in parallel with the detecting beam 113d while interposing a predetermined interval between the detecting beam 113d and the supporting portion 111e. The detecting beam 113e connects an end of the reinforcing beam 112f on the side of the supporting portion 111e with an end of the reinforcing beam 112g on the side of the supporting portion 111e.

A substantially central portion in the longitudinal direction of the detecting beam 113d and a substantially central portion in the longitudinal direction of the detecting beam 113e facing the detecting beam 113d are connected by a detecting beam 113f disposed in perpendicular to the detecting beam 113d and the detecting beam 113e.

Inside the reinforcing beam 112c between the supporting portion 111c and the supporting portion 111d, a detecting beam 113g is disposed for detecting distortion, wherein both ends of the detecting beam 113g are fixed to the supporting portion 111c and the supporting portion 111d in parallel with the reinforcing beam 112c while interposing a predetermined interval between the detecting beam 113g and the reinforcing beam 112c (adjacent supporting portions are connected to each other).

Between the detecting beam 113g and the supporting portion 111e, the detecting beam 113h is disposed in parallel with the detecting beam 113g while interposing a predetermined interval between the detecting beam 113h and the detecting beam 113g. The detecting beam 113h connects an end of the reinforcing beam 112g on the side of the supporting portion 111e with an end of the reinforcing beam 112h on the side of the supporting portion 111e.

A substantially central portion in the longitudinal direction of the detecting beam 113g and a substantially central portion in the longitudinal direction of the detecting beam 113h facing the detecting beam 113g are connected by a detecting beam 113i disposed in perpendicular to the detecting beam 113g and the detecting beam 113h.

Inside the reinforcing beam 112d between the supporting portion 111d and the supporting portion 111a, a detecting beam 113j is disposed for detecting distortion, wherein both ends of the detecting beam 113j are fixed to the supporting portion 111d and the supporting portion 111a in parallel with the reinforcing beam 112d while interposing a predetermined interval between the detecting beam 113j and the reinforcing beam 112d (adjacent supporting portions are connected to each other).

Between the detecting beam 113j and the supporting portion 111e, the detecting beam 113k is disposed in parallel with the detecting beam 113*j* while interposing a predetermined interval between the detecting beam 113*h* and the detecting beam 113*g*. The detecting beam 113*k* connects an end of the reinforcing beam 112*h* on the side of the supporting portion 111*e* with an end of the reinforcing beam 112*e* on the side of the supporting portion 111*e*.

A substantially central portion in the longitudinal direction of the detecting beam 113*j* and a substantially central portion in the longitudinal direction of the detecting beam 113*k* facing the detecting beam 113*i* are connected by a detecting beam 113*l* disposed in perpendicular to the detecting beam 113*j* and the detecting beam 113*k*.

The detecting beams 113*a*-113*l* are disposed on the upper end side in the thickness direction of the supporting portions 111*a*-111*e* and can be formed, for example, from the active layer of the SOI substrate. The width (connecting beam) of the detecting beams 113*a*-113*l* may be, for example, about 75 µm. The width (short-end direction) of the detecting beams 113*a*-113*l* may vary depending on the position. The upper surface of each of the detecting beams 113*a*-113*l* is substantially on the same plane as that of the upper surface of the supporting portions 111*a*-111*e*. The thickness of each of the detecting beams 113*a*-113*l* may be, for example, about 50 µm.

A force point 114*a* is provided on the lower surface side (an intersection point between the detecting beam 113*a* and the detecting beam 113*c*) of the central portion of the detecting beam 113*a* in the longitudinal direction. The detecting beams 113*a*, 113*b*, and 113*c* form a set of detecting blocks with the force points 114*a*.

A force point 114*b* is provided on the lower surface of the central portion of the detecting beam 113*d* in the longitudinal direction (an intersection point between the detecting beam 113*d* and the detecting beam 113*f*). The detecting beams 113*d*, 113*e*, and 113*f* and the force point 114*b* form a set of detecting blocks.

A force point 114*c* is provided on the lower surface of the central portion of the detecting beam 113*g* in the longitudinal direction (an intersection of the detecting beam 113*g* and the detecting beam 113*i*). The detecting beams 113*g*, 113*h*, and 113*i* and the force point 114*c* form a set of detecting blocks.

A force point 114*d* is provided on the lower surface (an intersection point between the detecting beam 113*j* and the detecting beam 113*l*) of the central portion of the detecting beam 113*j* in the longitudinal direction. A set of detecting blocks is formed by the detecting beams 113*j*, 113*k*, and 113*l* and the force point 114*d*.

At the force points 114*a*-114*d*, external force is applied and can be formed, for example, from the BOX layer and the supporting layer of the SOI substrate. The lower surface of each of the force points 114*a*-114*d* is roughly flush with the bottom surface of the support portions 111*a*-111*e*.

Thus, by taking in the force or displacement from the four force points 114*a* to 114*d*, the deformation of the beams differs for each type of force, so that a sensor with a good 6-axis separation property can be implemented.

In the sensor chip 110, from the viewpoint of suppressing stress concentration, it is preferable that a portion forming the inner angle be in a R-like shape.

Figure 5:
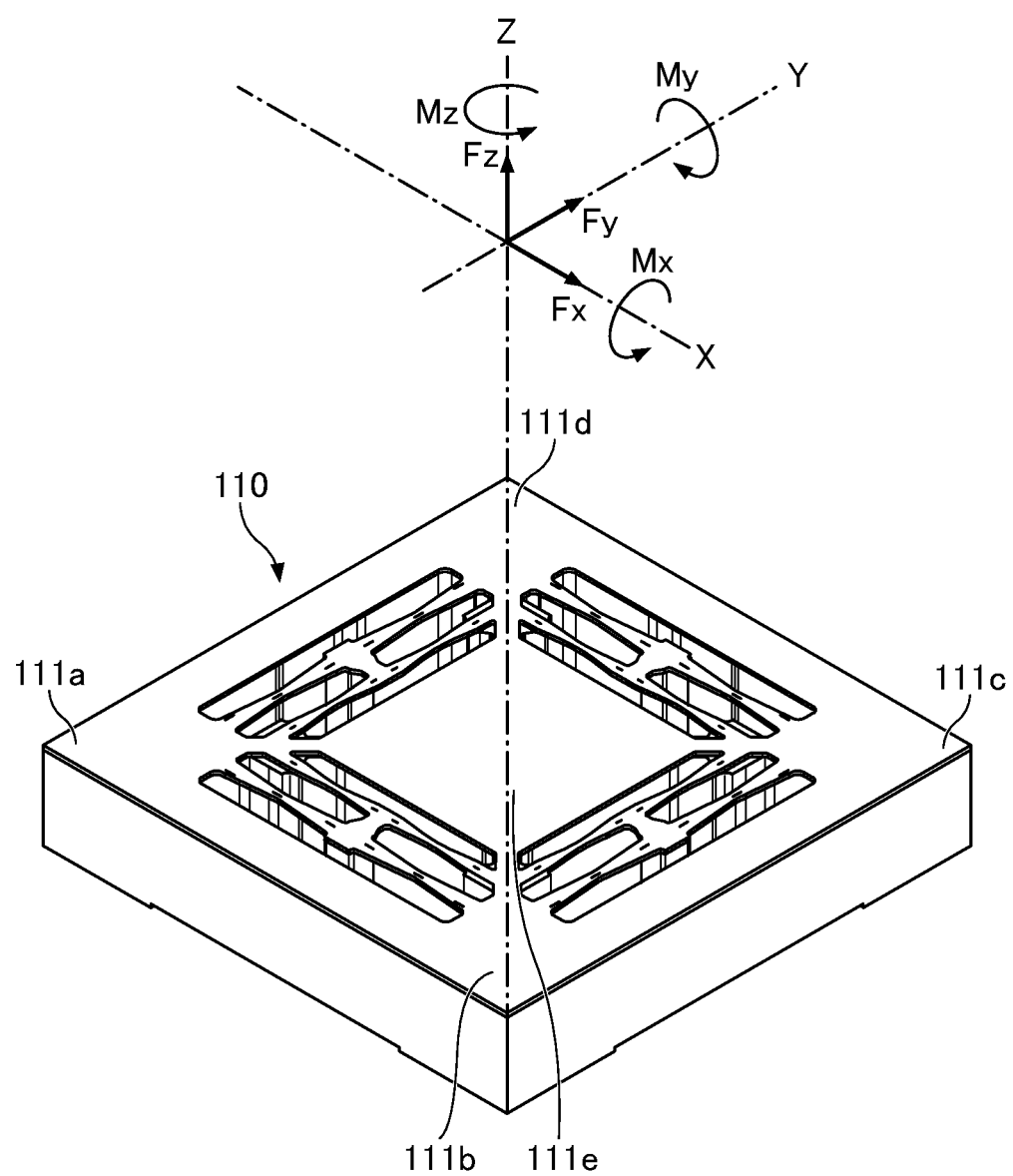
FIG. 5 explains reference symbols indicating force and moment applied to each axis according to the embodiment.

FIG. 5 illustrates a reference symbol indicating force and a moment applied to each axis. As illustrated in FIG. 5, the X-axis direction force is Fx, the Y-axis direction force is Fy, and the Z-axis direction force is Fz. The moment to rotate around the X axis is Mx, the moment to rotate around the Y axis is My, and the moment to rotate around the Z axis as the axis is Mz.

Figure 6:
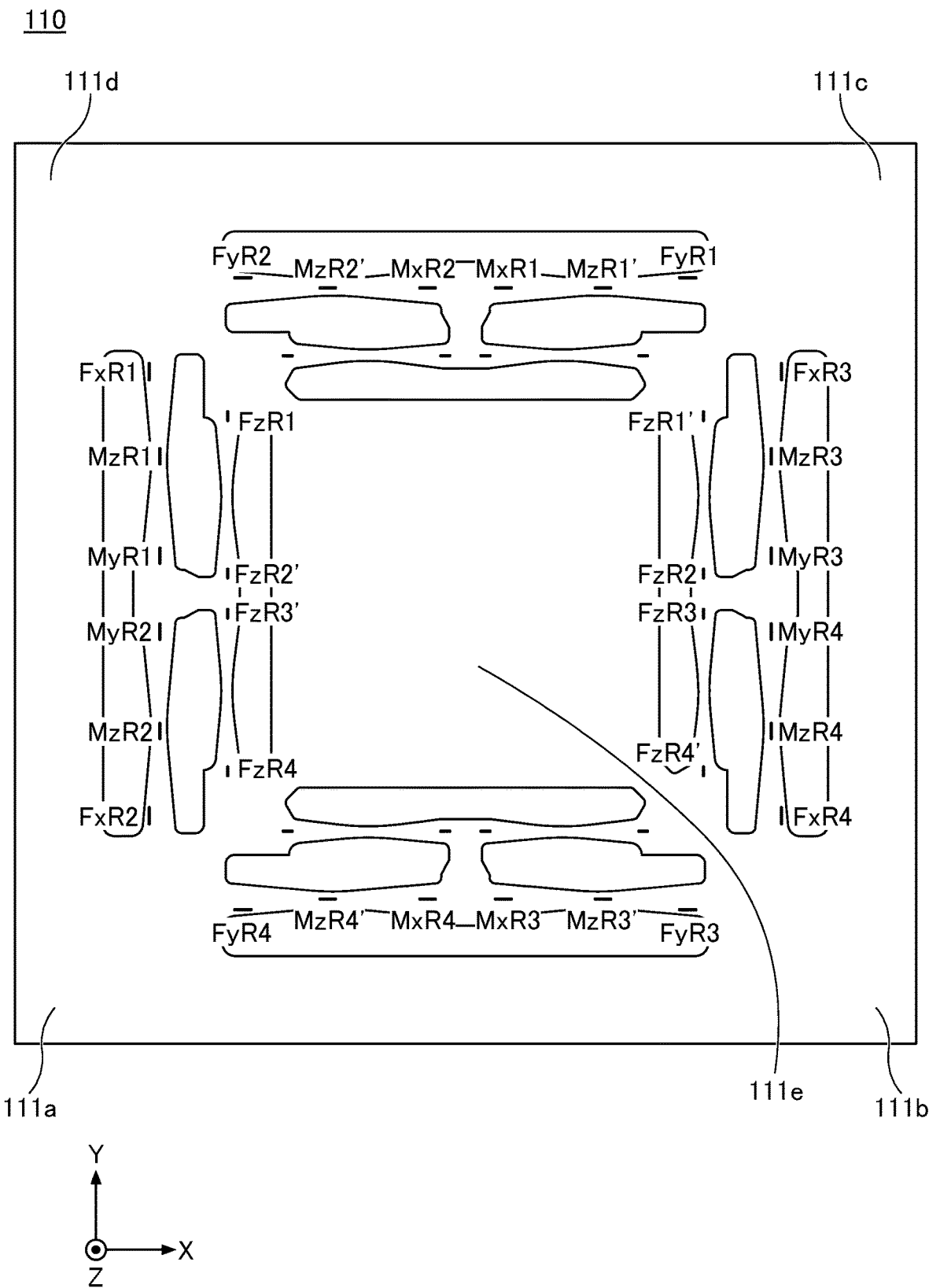
FIG. 6 illustrates the arrangement of piezoresistive elements of an example of the sensor chip according to the embodiment.

FIG. 6 illustrates the arrangement of piezoresistive elements of the sensor chip 110. A plurality of strain detecting elements, a piezoresistive element, is disposed in a predetermined position of each detecting block corresponding to four force points 114*a* to 114*d*.

Specifically, referring to FIGS. 3 and 6, in the detecting block corresponding to the force point 114*a*, the piezoresistive elements MxR3 and MxR4 are disposed at the position symmetric with respect to a line that bisects the detecting beam 113*a* in the longitudinal direction and are symmetric with respect to a line that bisects the detecting beam 113*c* in the longitudinal direction (the Y direction) in a region close to the detecting beam 113*c*. The piezoresistive elements FyR3 and FyR4 are positioned on the side of the reinforcing beam 112*a* relative to the line dividing the detecting beam 113*a* in the longitudinal direction equally, and at the position symmetric relative to the line dividing the detecting beam 113*c* in the longitudinal direction at a distance from the detecting beam 113*c*. The piezoresistive elements MzR3' and MzR4' are disposed on a line that bisects the detecting beam 113*a* in the longitudinal direction and at the position symmetric relative to a line that bisects the detecting beam 113*c* in the longitudinal direction in a region near the midpoint of the connection between the support portion 111*a* and the end portion 111*b* of the detecting beam 113*a* and the detecting beam 113*c*.

In the detecting block corresponding to the force point 114*b*, the piezoresistive elements MyR3 and MyR4 are arranged on a line that bisects the detecting beam 113*d* in the longitudinal direction and at the position symmetric relative to a line that bisects the detecting beam 113*f* in the longitudinal direction (the X direction) in a region near the detecting beam 113*f* of the detecting beam 113*d*. The piezoresistive elements FxR3 and FxR4 are disposed at a position symmetric to a line that is more than a line that divides the detecting beam 113*d* equally in the longitudinal direction and a line that divides the detecting beam 113*f* in the longitudinal direction in a region far from the detecting beam 113*f* of the detecting beam 113*d*. The piezoresistive elements MzR3 and MzR4 are disposed on a line that bisects the detecting beam 113*d* in the longitudinal direction and at the position symmetric with respect to a line that bisects the detecting beam 113*f* in the longitudinal direction in a region near the midpoint of the connecting portion between the end on a side of the supporting portions 111*b* and 111*c* of the detecting beam 113*d* and the detecting beam 113*f*.

The piezoresistive elements FzR2 and FzR3 are disposed on a line that bisects the detecting beam 113*e* in the longitudinal direction and at the position symmetric relative to a line that bisects the beam 113*f* longitudinal direction in a region close to the detecting beam 113*f* of the detecting beam 113*e*. The piezoresistive elements FzR1' and FzR4' are arranged on a line that bisects the detecting beam 113*e* in the longitudinal direction and at the position symmetric relative to a line that bisects the detecting beam 113*f* in the longitudinal direction in a distance from the detecting beam 113*f* of the detecting beam 113*e*.

In the detecting block corresponding to the force point 114*c*, the piezoresistive elements MxR1 and MxR2 are disposed on a line that bisects the detecting beam 113*g* in the longitudinal direction and at the position symmetric relative to a line that bisects the detecting beam 113*i* in the longitudinal direction (the Y direction) in a region close to the detecting beam 113*i*. The piezoresistive elements FyR1 and FyR2 are disposed on the side of the reinforcing beam 112*c* relative to the line that bisects the detecting beam 113*g* in the longitudinal direction equally, and at the position symmetric relative to the line that bisects the detecting beam 113*i* in the longitudinal direction in a distance from the detecting beam 113*i*. The piezoresistive elements MzR1' and MZR2' are disposed on a line that bisects the detecting beam 113*g* in the longitudinal direction and at a position symmetric relative to a line that bisects the detecting beam 113*i* in the longitudinal direction in a region near the midpoint of the connecting portion between the end of the detecting beam 113*g* on the side of the supporting portions 111*c* and 111*d* and the detecting beam 113*i*.

In the detecting block corresponding to the force point 114*d*, the piezoresistive elements MyR1 and MyR2 are arranged on a line that bisects the detecting beam 113*j* in the longitudinal direction and at the position symmetric relative to a line that bisects the detecting beam 113*l* in the longitudinal direction (X direction) in a region close to the detecting beam 113*l* of the detecting beam 113*j*. The piezoresistive elements FxR1 and FxR2 are disposed at a position symmetric to a line that is more distal to the reinforcing beam 112*d* than the line that bisects the detecting beam 113*j* in the longitudinal direction and bisects the detecting beam 113*l* in the longitudinal direction in a region far from the detecting beam 113*l* of the detecting beam 113*j*. The piezoresistive elements MzR1 and MzR2 are disposed on a line that bisects the detecting beam 113*j* in the longitudinal direction and at the position symmetric relative to a line that bisects the detecting beam 113*l* in the longitudinal direction in a region near the midpoint of the connecting portion between the end on the side of the support portions 111*d* and 111*a* of the detecting beam 113*j* and the detecting beam 113*l*.

The piezoresistive elements FzR1 and FzR4 are disposed on a line that bisects the detecting beam 113*k* in the longitudinal direction and at a position symmetric relative to a line that bisects the detecting beam 113*l* in the longitudinal direction in a region far from the detecting beam 113*l* of the detecting beam 113*k*. The piezoresistive elements FzR2' and FzR3' are arranged on a line that bisects the detecting beam 113*k* in the longitudinal direction and at the position symmetric relative to a line that bisects the detecting beam 113*l* in the longitudinal direction in a region close to the detecting beam 113*l* of the detecting beam 113*k*.

In this manner, a plurality of piezoresistive elements are disposed separately in each detecting block of the sensor chip 110.
This allows a predetermined axial displacement of up to six axes to be detected based on a change in the output of a plurality of piezoresistive elements disposed in a predetermined beam according to the direction (axial direction) of the force applied (transmitted) to the force points 114*a*-114*d*.

The sensor chip 110 has a structure such that the detecting beams 113*c*, 113*f*, 113*i*, and 113*l* are as short as possible to dispose the detecting beams 113*b*, 113*e*, 113*h*, and 113*k* closer to the detecting beams 113*a*, 113*d*, 113*g*, and 113*j* and to secure the lengths of the detecting beams 113*b*, 113*e*, 113*h*, and 113*k* as long as possible. This structure makes the detecting beams 113*b*, 113*e*, 113*h*, and 113*k* easy to flex in a bow-like fashion, thereby alleviating stress concentration and improving the load resistance.

In the sensor chip 110, a piezoresistive element is not disposed in the detecting beams 113*c*, 113*f*, 113*i*, and 113*l*. Instead, the piezoresistive element is disposed in the vicinity of a position where the stress of the detecting beams 113*a*, 113*d*, 113*g*, and 113*j* and the detecting beams 113*b*, 113*e*, 113*h*, and 113*k*, which are thinner, longer, more flexible like a bow in comparison with the detecting beams 113*c*, 113*f*, 113*i*, and 113*l*, becomes the maximum. As a result, the sensor chip 110 can efficiently capture stress so as to improve sensitivity (the change in resistance of the piezoresistive element to the same stress).

In the sensor chip 110, a dummy piezoresistive element is disposed in addition to the piezoresistive element used for detecting distortion. The dummy piezoresistive element is arranged such that all piezoresistive elements, including the piezoresistive elements used for detecting distortion, are point-symmetric relative to the center of the supporting portion 111*e*.

Here, the piezoresistive elements FxR1 to FxR4 detect force Fx, piezoresistive elements FyR1 to FyR4 detect force Fy, and piezoresistive elements FzR1 to FzR4, and FzR1' to FzR4' detect force Fz. The piezoresistive elements MxR1-MxR4 detect moment Mx, the piezoresistive elements MyR1-MyR4 detect moment My, and the piezoresistive elements MzR1-MzR4 and MzR1'-MzR4' detect moment Mz.

In this manner, a plurality of piezoresistive elements are separately disposed in each detecting block in the sensor chip 110. This allows a displacement in a predetermined axial direction to be detected up to six axes based on a change in the output of a plurality of piezoresistive elements disposed on a predetermined beam in response to the force applied (transmitted) to or a displacement orientation (axial direction) at the force points 114*a*-114*d*.

In the sensor chip according to the above embodiment, a plurality of strain detecting elements of piezoresistive elements include a first detecting portion (R1, R2, R3, R4) having four strain detecting elements capable of detecting force in a first direction in the Fz direction or in the Mz direction, and a second detecting portion (R1', R2', R3', R4') having four strain detecting elements capable of detecting force in the first direction and disposed at a position symmetric relative to the first detecting portion. That is, the moment (Mx, My) in the X-axis direction and Y-axis direction can be detected based on the deformations of the first detecting beam 113*a*, 113*d*, 113*g*, and 113*j*. The force (Fz) in the Z-axis direction can be detected based on deformation of the detecting beams 113*e* and 113*k*, which are the second detecting beam.

In the sensor chip 110, the displacement (Fx, Fy, Mz) in the X-axis direction and the Y-axis direction can be detected based on the deformation of the predetermined detecting beam. That is, the force (Fx, Fy) in the X-axis direction and the Y-axis direction can be detected based on the deformation of the detecting beams 113*a*, 113*d*, 113*g*, and 113*j*, which are the first detecting beam. The moment (Mz) in the Z-axis direction can be detected based on the deformation of the first detecting beam, the detecting beams 113*a*, 113*d*, 113*g*, and 113*j*.

In the sensor chip according to the above embodiment, a plurality of strain detecting elements of piezoresistive elements include a first detecting portion (R1, R2, R3, R4) having four strain detecting elements capable of detecting force in a first direction in the Fz direction or in the Mz direction, and a second detecting portion (R1', R2', R3', R4') having four strain detecting elements capable of detecting force in the first direction and disposed at a position symmetric relative to the first detecting portion. Here, when the first direction is the Fz direction, the first detecting portion is FzR1 to FzR4, and the second detecting portion is FzR1' to FzR4'. For example, FzR2 and FzR3, which are a part of the first detecting portion, and FzR1' and FzR4', which are a part of the second detecting portion, are formed in one second detecting beam 113*e*, and the remainder of the first detecting portion, FzR1 and FzR4, which are a part of the second detecting portion, and the remainder of the second detecting portion, FzR2' and FzR3' are formed in another second detecting beam 113k, which is provided in parallel with the second detecting beam 113e. Alternatively, when the first direction is the Mz direction, the first detecting portion is MzR1 to MzR4 and the second detecting portion is MzR1' to MzR4'. For example, a first detecting portion MzR1 to MrR4 is formed on a pair of first detecting beam 113d and 113j parallel to each other, and a second detecting portion MzR1' to MzR4' is formed on another pair of first detecting beam 113a and 113g orthogonal to the first detecting beam of one pair. Also, the above "symmetry" is line symmetry or rotational symmetry. The sum of the number of strain detecting elements of the first detecting portion and the second detecting portion is a multiple of the number of the strain detecting elements that detect force in a direction different from the first direction.

More specifically, the first direction is the Fz direction, and the first and second detectors pass through the center of the substrate and are disposed at a position line-symmetric with respect to a line parallel to the Y-axis. That is, piezoresistive elements FzR1-FzR4 and piezoresistive elements FzR1'-FzR4' pass through the center of the substrate and are disposed at a position line-symmetric with respect to a line parallel to the Y-axis, as illustrated in FIGS. 3 and 6.

Alternatively, the first direction is the Fz direction, and the first detecting portion and the second detecting portion are disposed at a position rotation-symmetric with respect to the rotation around the Z-axis by 180 degrees. That is, the piezoresistive elements FzR1-FzR4 and the piezoresistive elements FzR1'-FzR4' are disposed at a position rotation-symmetric by 180 degrees relative to the rotation around the Z-axis, as illustrated in FIGS. 3 and 6.

Alternatively, the above-described first direction is in the Mz direction, and the first detecting portion and the second detecting portion are disposed at a position rotation-symmetric with respect to the rotation around the Z-axis by 90 degrees. That is, the piezoresistive elements MzR1-MzR4 and the piezoresistive elements MzR1'-MzR4' are disposed at a position rotation-symmetry by 90 degrees with respect to the rotation around the Z-axis, as illustrated in FIGS. 3 and 6.

In the sensor chip of this embodiment, one bridge circuit is provided for one of the axes to be detected. When the above-described first direction is the Fz direction, the first detecting portion is FzR1 to FzR4, and the second detecting portion is FzR1' to FzR4', the bridge circuit corresponding to Fz is formed from eight piezoresistive elements in total of four piezoresistive elements of the first detecting portion and four piezoresistive elements of the second detecting portion. Specifically, the bridge circuit is formed from the first, second, third, and fourth resistance portions by connecting FzR1 and FzR1' in series to form a first resistance portion, FzR2 and FzR2' in series to form a second resistance portion, FzR3 and FzR3' in series to form a third resistance portion, and FzR4 and FzR4' in series to form a fourth resistance portion.

In addition, when the above-described first direction is in the Mz direction, the first detecting portion is MzR1 to MzR4, and the second detecting portion is the MzR1' to MzR4', the bridge circuit corresponding to Mz is formed from a total of eight piezoresistive elements including four piezoresistive elements of the first detecting portion and four piezoresistive elements of the second detecting portion. Specifically, the bridge circuit is formed from a first resistance portion, second resistance portion, third resistance portion, and fourth resistance portion, wherein MzR1 and MzR1' are connected in series to form the first resistance portion, MzR2 and the MzR2' are connected in series to form the second resistance portion, MzR3 and MzR3' are connected in series to form the third resistance portion, and MzR4 and MzR4' are connected in series to form the fourth resistance portion.

It is also possible to include a first detecting portion (R1, R2, R3, and R4) having four strain detecting elements capable of detecting force in the first direction being the Fz direction, a second detecting portion (R1', R2', R3', and R4') having four strain detecting elements capable of detecting force in the first direction having four strain detecting elements provided at a position symmetric relative to the first detecting portion, and a third detecting portion (R1, R2, R3, and R4) having four strain detecting elements capable of detecting force in the second direction being the Mz direction, and a fourth detecting portion (R1', R2', R3', and R4') having four strain detecting elements provided at a position symmetric relative to the third detecting portion.

According to the sensor chip of this embodiment described above, the number of piezoresistive elements corresponding to Fz or Mz increases and the arrangement is symmetrical. When the piezoresistive element is not disposed symmetrically, a multi-axis interference occurs when a composite input is made to the force sensor device, and an axial separation property is degraded. In this embodiment, the axis separation property can be improved because the number of the piezoresistive elements is increased and the accuracy of the sensor is enhanced, and the placement of the arrangement of the piezoresistive elements is symmetrical.

For example, the resistance value of the strain detecting element (piezoresistive element) of the first detecting portion and the second detecting portion is half the resistance value of the strain detecting element other than the first detecting portion and the second detecting portion. As described above, a composite resistance in which one piezoresistive element of the first detecting portion and a corresponding one piezoresistive element of the second detecting portion are connected in series can be regarded as one resistive element of a bridge circuit. Accordingly, the resistance value of the piezoresistive elements of the first detecting portion and the second detecting portion may be about half that of other piezoresistive elements. In other words, the number of resistance elements is increased by doubling the number of the resistance elements and halving the resistance value of the piezoresistive element related to the conventional Fz or Mz (by dividing the resistive element), and the increased number of the resistance elements is disposed at a position line-symmetric or rotation-symmetric relative to the existing resistive element.

By varying the thickness and width of each detecting beam, it is possible to equalize the detection sensitivity and improve the detection sensitivity.

However, it is also possible to reduce the number of piezoresistive elements and provide a sensor chip for detecting predetermined axial displacements of 5 or less axes.

According to the sensor chip of the present embodiment described above, by disposing the piezoresistive element so as to be geometrically symmetric according to the shape of the beam, it is possible to accurately detect the six-component force even when the force and moment are input in a composite manner. In addition, when the number of piezoresistive elements is increased to make the symmetric arrangement, the combined resistance applied to the bridge circuit can be controlled simply by changing the size of the piezoresistive elements, so that the resistance value can be easily adjusted and the load on the circuit design is low. In addition, even if the number of the piezoresistive elements is increased, the number of steps does not increase and does not lead to an increase in cost, since the piezoresistive elements can be manufactured by a semiconductor process using a photolithographic process. On the other hand, the strain gauge is applied to the strain generator and it is almost impossible to increase the number of piezoresistive elements and arrange them symmetrically. However, it is possible in the force sensor device of this embodiment using the MEMS-type sensor chip.

Strain Generator 20

Figure 7:
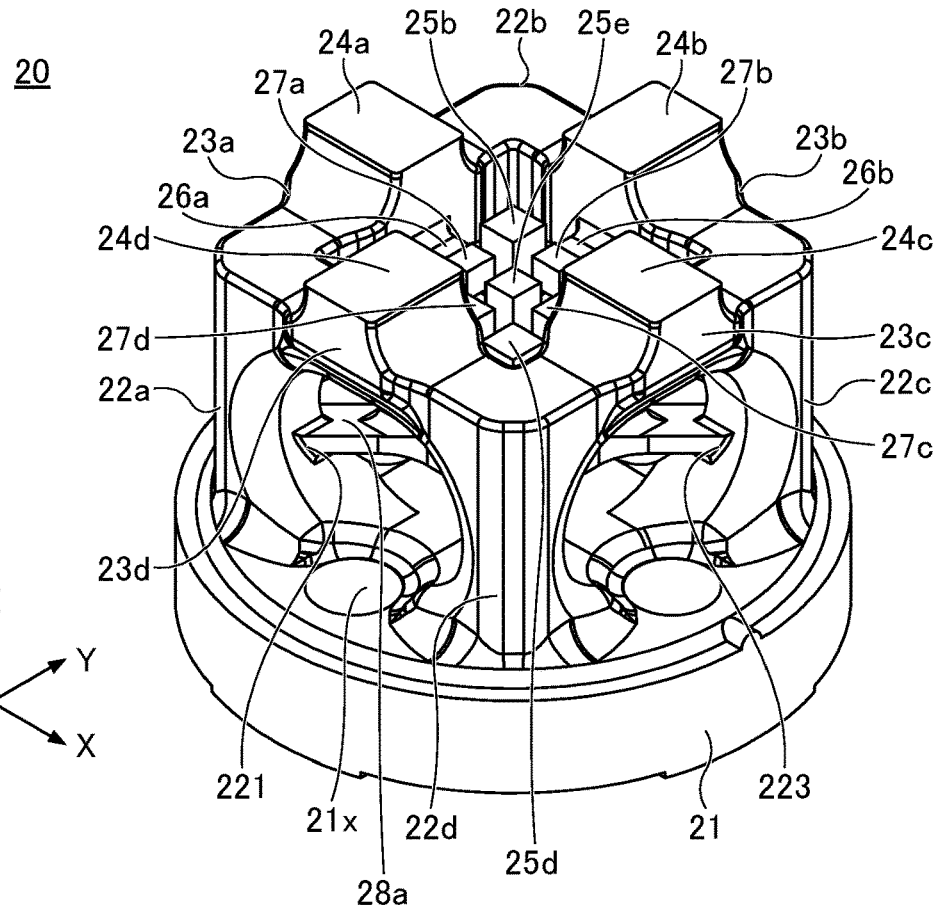
FIG. 7 is a diagram (1) illustrating an example of the strain generator according to the embodiment.
Figure 7:
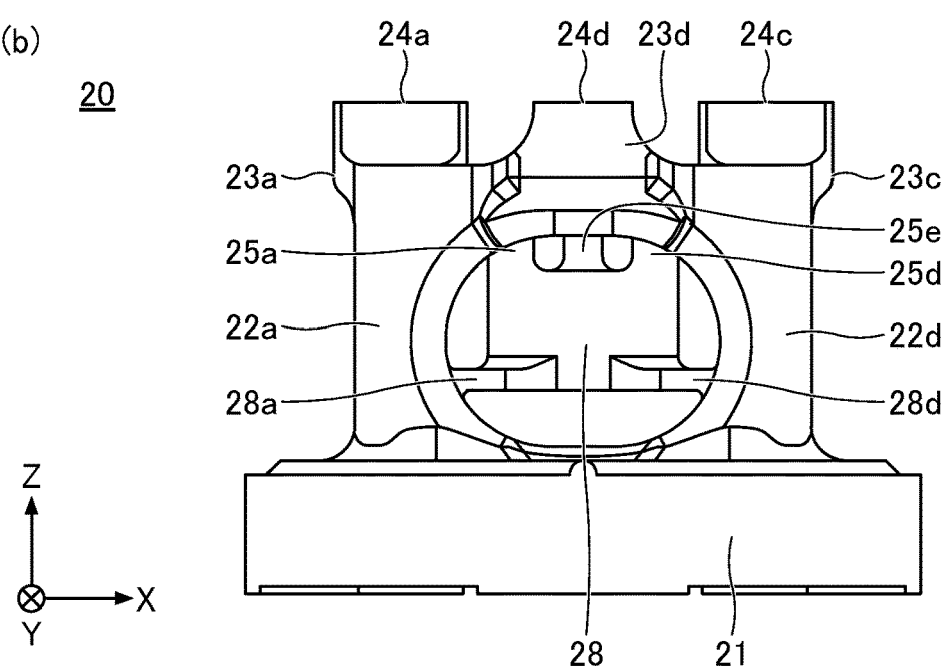
Figure 8:
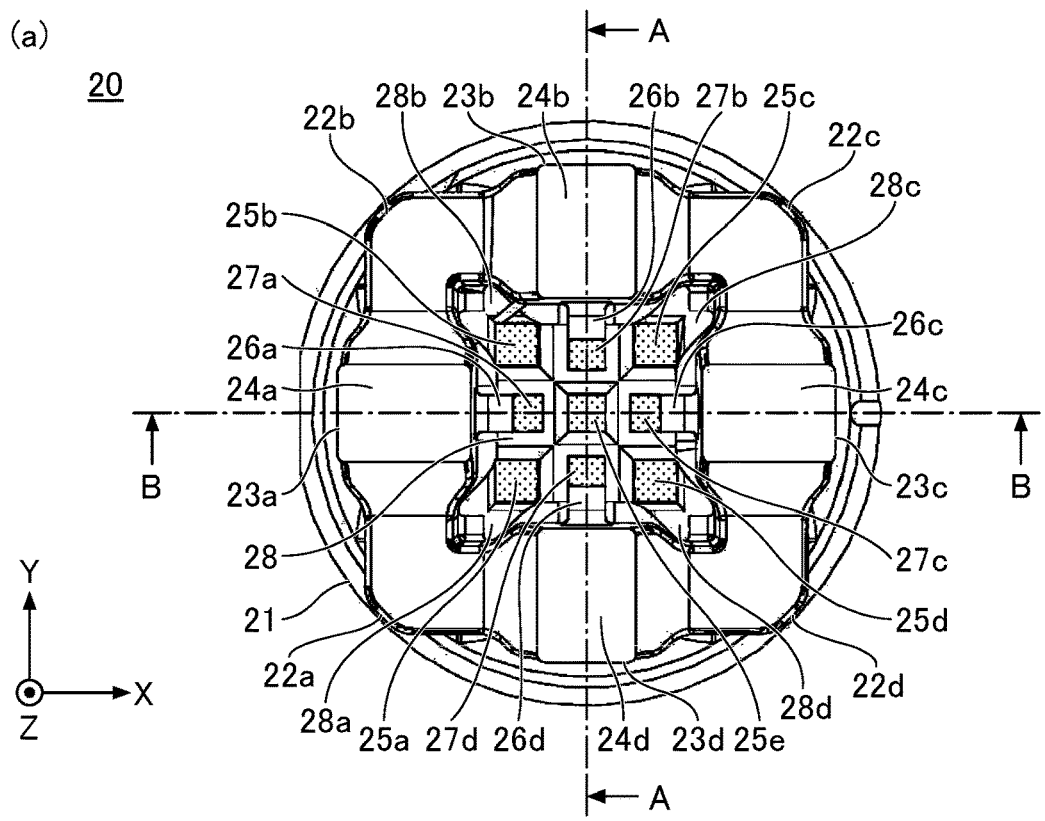
FIG. 8 is a diagram (2) illustrating an example of the strain generator according to the embodiment.
Figure 8:
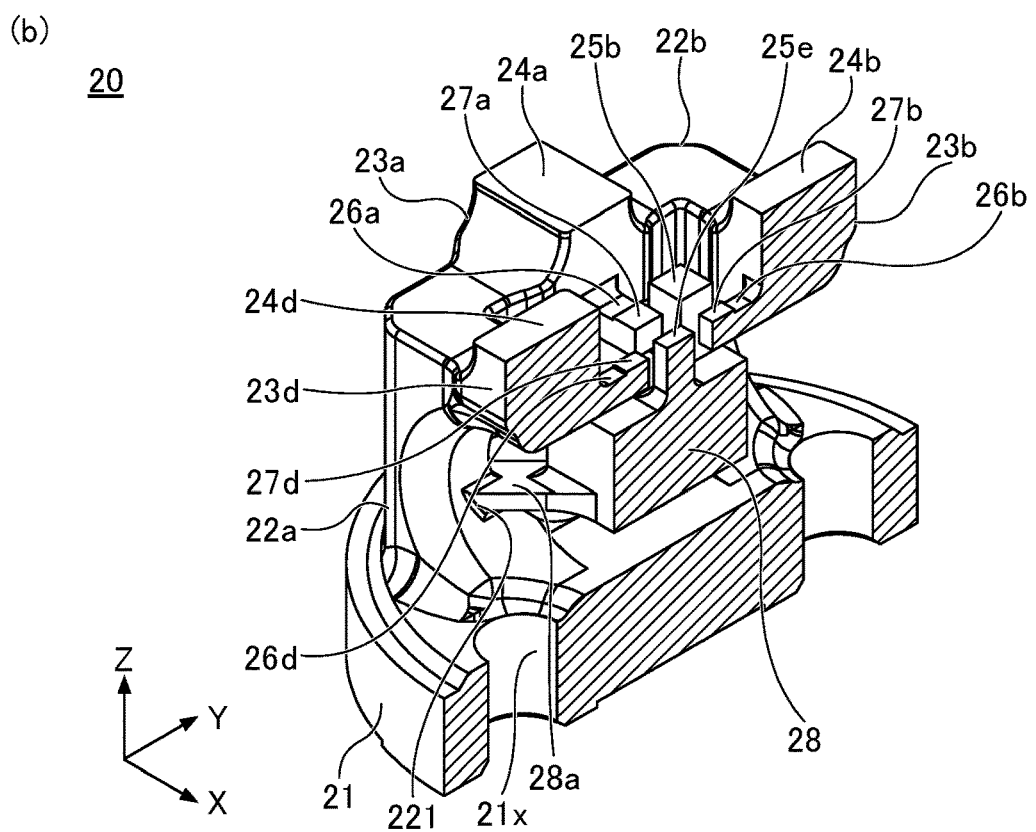
Figure 9:
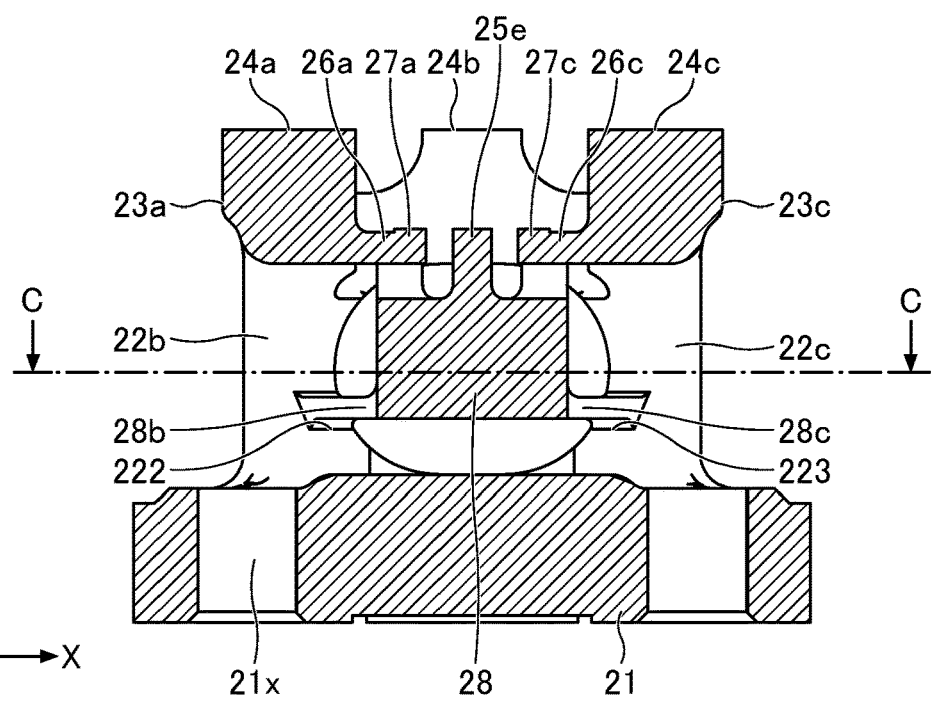
FIG. 9 is a diagram (3) illustrating an example of the strain generator according to the embodiment.
Figure 9:
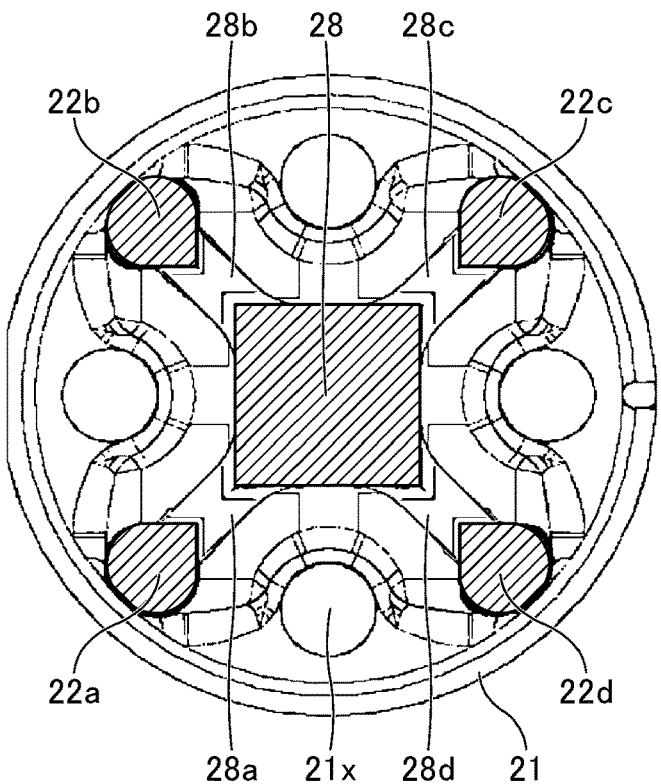

FIG. 7 is a diagram (first view) illustrating the strain generator 20, In FIG. 7, (a) is a perspective view, and (b) is a side view. In FIG. 8, (a) is a plan view and (b) is a longitudinal perspective view along the A-A line of (a). In FIG. 8, (a), for convenience, surfaces of the same height are indicated by the same satin pattern. FIG. 9 is a view (third view) illustrating the strain generator 20. In FIG. 9, (a) is a vertical cross-sectional view along a B-B line of FIG. 8, (a), and (b) is a horizontal cross-sectional view along a C-C line of (a).

As illustrated in FIGS. 7-9, the strain generator 20 includes a base 21 which is mounted directly onto a fixture portion, a support column 28 which is a sensor chip mounting portion mounting the sensor chip 110, and columns 22a-22d disposed around the support column while interposing a space in the periphery of the support column 28.

More specifically, in the strain generator 20, four columns 22a-22d are disposed on the upper surface of the base 21 in a circle-like shape to be even (point-symmetry) relative to the center of the base 21, and four beams 23a-23d, which are the first beams connecting adjacent columns together, are provided so as to be formed like a frame. Then, the support column 28 is disposed above the center of the upper surface of the base 21. The planar shape of the base 21 is not limited to the shape like circle, but may be a shape like a polygon (e.g., square).

The support column 28 is formed to be thicker and shorter than the columns 22a-22d. The sensor chip 110 is fixed onto the support column 28 so as not to protrude from the upper surfaces of the columns 22a-22d.

The support column 28 is not secured directly to the upper surface of the base 21, but is secured to the columns 22a-22d via connecting beams 28a-28d. Therefore, there is space between the upper surface of the base 21 and the lower surface of the support column 28. The lower surface of the support column 28 and the lower surfaces of each of the connecting beams 28a-28d may be on a flat surface.

The cross-sectional shape of the portion to which the connecting beams 28a-28d of the support column 28 is connected is in a, for example, a rectangular shape, with the four corners of the rectangular shape and the columns 22a-22d facing the four corners of the rectangular shape being connected via the connecting beams 28a-28d. Preferably, positions 221-224 at which the connecting beams 28a-28d are connected to the columns 22a-22d are below midway in the height direction of the columns 22a-22d. The reasons for this are described later. The cross-sectional shape of a part to which the connecting beams 28a to 28d of the support column 28 are connected is not limited to a rectangular shape, but may be a circular shape or a polygonal shape (for example, a hexagon shape).

The connecting beams 28a-28d are disposed substantially parallel to the upper surface of the base 21 while interposing predetermined intervals between the upper surface of the base 21 and the connecting beams 28a-28d so as to be equal (point-symmetry) with respect to the center of the base 21. The width and thickness (rigidity) of the connecting beams 28a-28d are preferably narrower and thinner than the columns 22a-22d and the beams 23a-23d so as not to prevent the deformation of the strain generator 20.

Thus, the upper surface of the base 21 and the lower surface of the support column 28 are separated by a predetermined distance. The predetermined distance may be, for example, on the order of several millimeters.

In the base 21, a through hole 21x is provided for fastening the strain generator 20 to the fixture portion using a screw or the like. In this embodiment, the base 21 is provided with four through-holes 21x, but the number of through-holes 21x can be arbitrarily determined.

Except for the base 21, the strain generator 20 may have a rectangular shape, for example, about 5000 μm in length, about 5000 μm in width, and about 7000 μm in height. The cross-sectional shape of the columns 22a-22d may be, for example, square of about 1000 μm square. The cross-sectional shape of the post 28 may be, for example, a square of about 2000 μm square.

However, from the viewpoint of suppressing stress concentration in the strain generator 20, it is preferable that the portion forming the inner angle be in a shape like R. For example, the central surface of the upper surface of the pedestal 21 of the columns 22a-22d is preferably formed in an R-shape. Similarly, surfaces facing the upper surface of the base 21 of beams 23a-23d are preferably formed in the R-shape on the right and left sides.

A central portion in the longitudinal direction of each of the upper surfaces of the beams 23a-23d is provided with a protruding portion upwardly protruding from the central portion of the beams 23a-23d in the longitudinal direction, and input portions 24a-24d in a shape like quadrangular prism are provided on the protruding portion. The input portions 24a-24d are externally applied with force, and when the force is applied to input portions 24a-24d, the beams 23a-23d and the columns 22a-22d are deformed accordingly.

Thus, by providing four input portions 24a-24d, the load resistance of the beams 23a-23d can be improved in comparison with, for example, the structure of one input portion.

Four sub-columns 25a-25d are disposed in the four corners of the upper surface of the support column 28, and a fourth pillar 25e is disposed in the center of the upper surface of the support column 28. The sub-columns 25a-25e are formed so as to have the same height.

That is, the upper surfaces of each of the sub-columns 25a-25e are on the same flat plane. Each upper surface of the sub-columns 25a-25e is a junction bonded to the lower surface of the sensor chip 110.

Central portions of inner side surfaces of the beams 23a-23d are provided with sub-beams 26a-26d projecting horizontally inwardly from each of the inner surfaces of the beams 23a-23d. The sub-beams 26a-26d are second beams that transmit deformation of the beams 23a-23d and columns 22a-22d to sensor chip 110. Front end side of the upper surfaces of the sub-beams 26a-26d are also provided with protruding portions 27a-27d projecting upwardly from the front end side of the upper surfaces of the sub-beams 26a-26d, respectively.

The protruding portions 27a-27d are formed to have the same height. That is, the upper surfaces of the protruding portions 27a-27d are on the same flat plane. Each upper surface of the protruding portions 27a-27d is a joining portion bonded to the lower surface of the sensor chip 110.

The sub-beams 26a-26d and protruding portions 27a-27d are connected to the beams 23a-23d as movable portions. Therefore, these are deformed when force is applied to the input portions 24a-24d.

Incidentally, in a state where no force is applied to the input portions 24a to 24d, the respective upper surfaces of the sub-columns 25a-25e and the respective upper surfaces of the protruded portions 27a to 27d are positioned on the same plane.

The portions of the base 21, columns 22a-22d, support column 28, beams 23a-23d, input portions 24a-24d, sub-columns 25a-25e, sub-beams 26a-26d, and protruding portions 27a-27d are preferably integrally formed from a viewpoint of ensuring rigidity and precisely manufacturing. For example, a hard metallic material such as SUS (stainless steel) may be used as the material of the strain generator 20. Among them, it is preferable to use SUS 630 which is particularly rigid and of high mechanical strength.

Thus, as with the sensor chip 110, the strain generator 20 is also constructed with columns and beams, so that the deformation of each of the six axes is caused by the applied force, so that the deformation of the six axes with good separation can be transmitted to the sensor chip 110.

That is, the force applied to the input portions 24a-24d of the strain generator 20 is transmitted to the sensor chip 110 via columns 22a-22d, the beams 23a-23d, and the sub-beams 26a-26d, and the displacement is detected by the sensor chip 110. Then, in the sensor chip 110, the output of each axis can be obtained from a bridge circuit formed one by one for each axis.

Process of Manufacturing the Force Sensor Device 1

Figure 10:
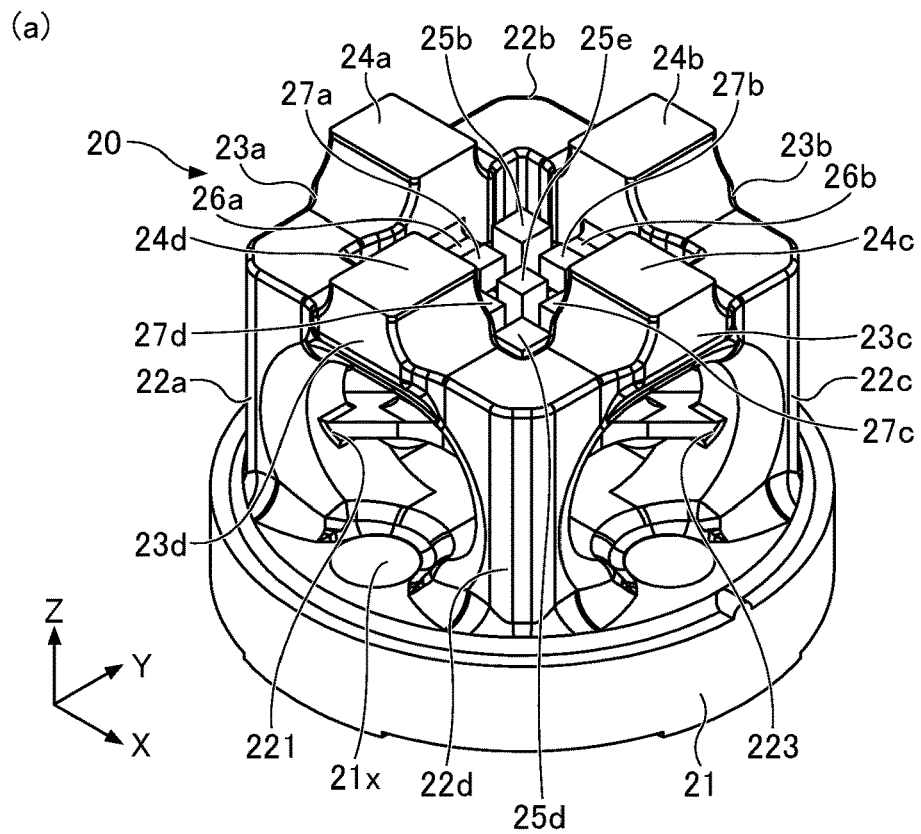
FIG. 10 is a diagram (1) illustrating an example of a manufacturing process of the force sensor device according to the embodiment.
Figure 10:
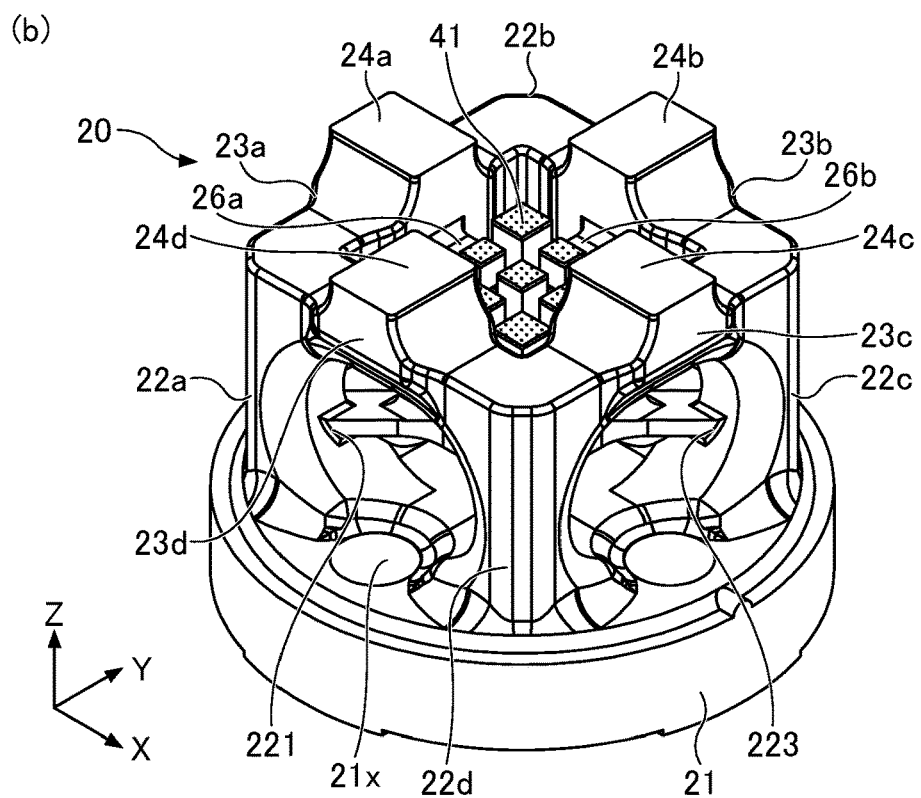
Figure 11:
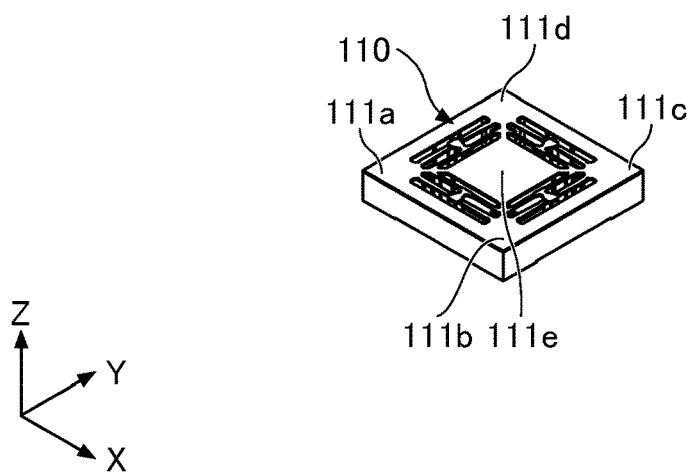
FIG. 11 is a diagram (2) illustrating an example of the manufacturing process of the force sensor device according to the embodiment.
Figure 11:
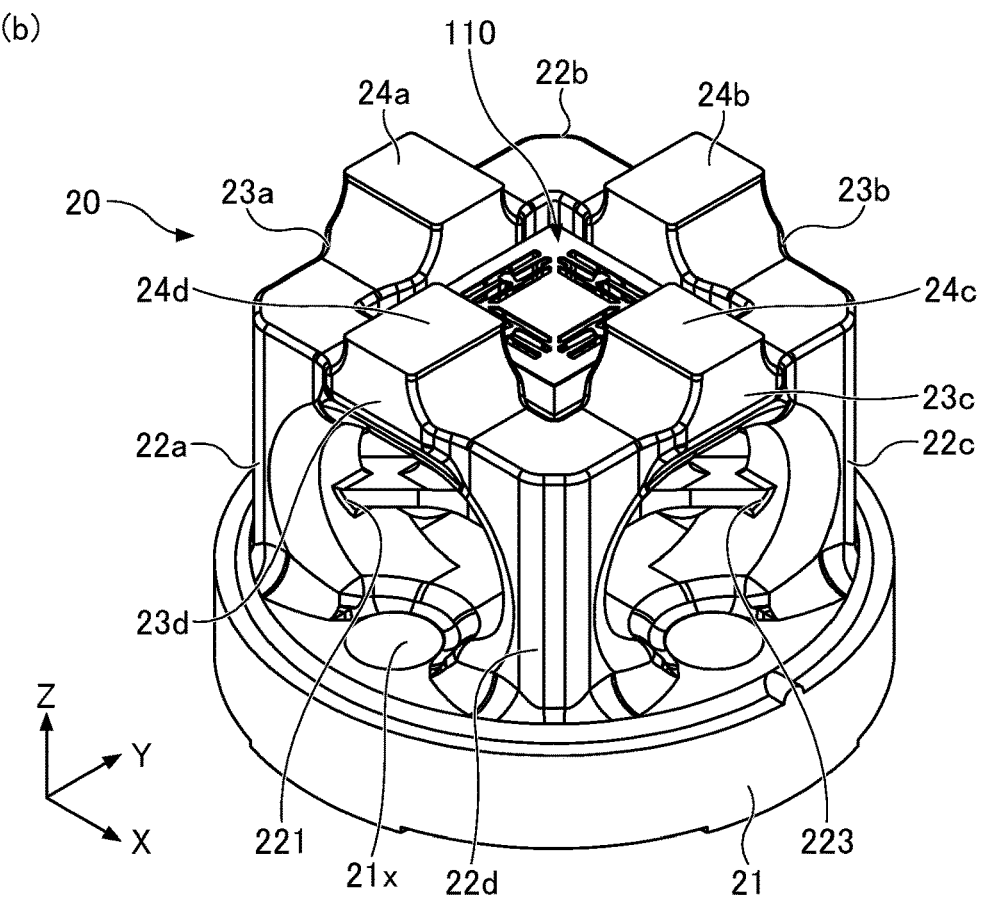
Figure 12:
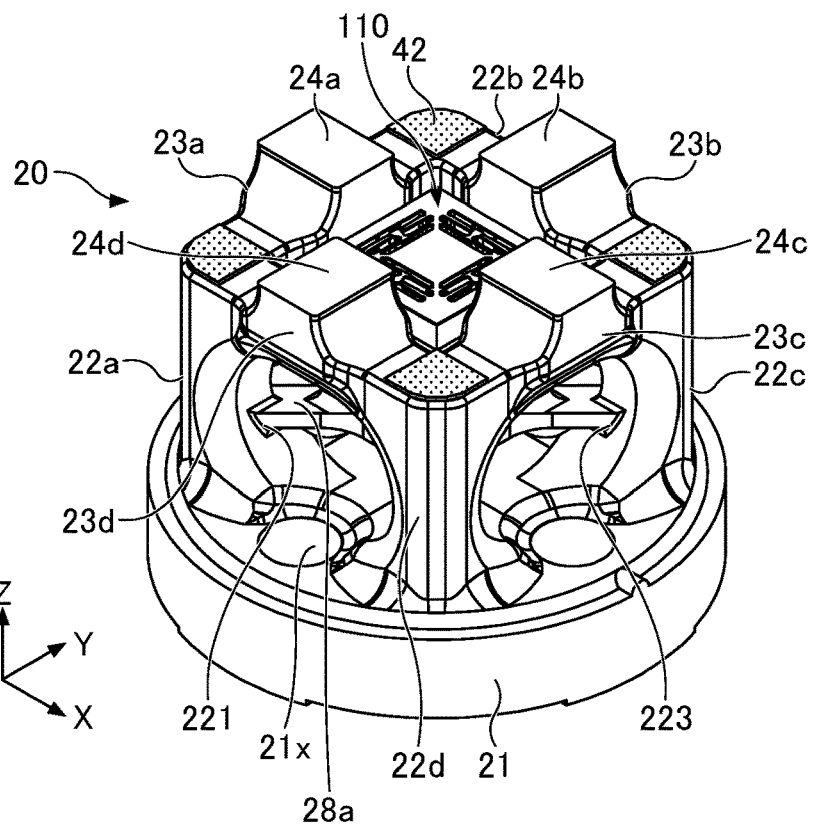
FIG. 12 is a diagram (3) illustrating an example of the manufacturing process of the force sensor device according to the embodiment.
Figure 12:
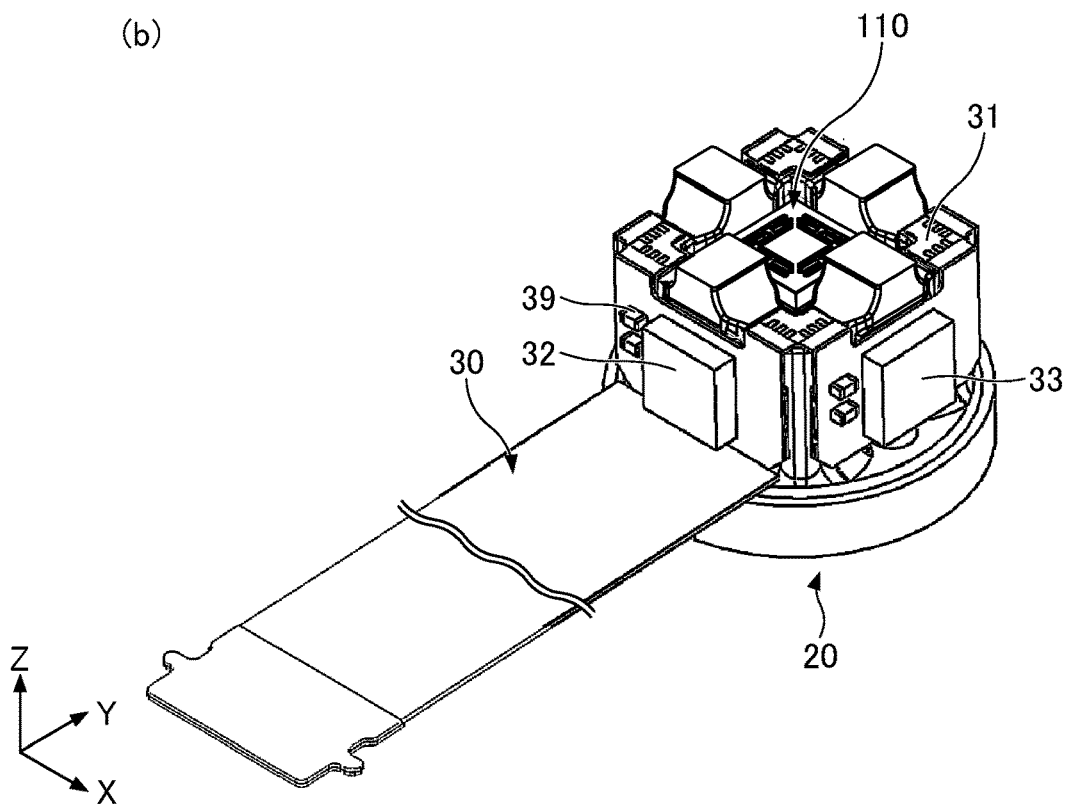

FIGS. 10 to 12 are diagrams illustrating a manufacturing process of the force sensor device 1. First, as illustrated in (a) of FIG. 10, the strain generator 20 is made. The strain generator 20 can be integrally formed, for example, by molding, cutting, wire discharge, or the like. For example, a hard metallic material such as SUS (stainless steel) may be used as the material of the strain generator 20. Among them, it is preferable to use a SUS 630 which is particularly hard and of high mechanical strength. When the strain generator 20 is formed by molding, for example, metal particles and resin as a binder are molded in a metallic mold, and then the resin is sintered to vaporize the resin, thereby forming the strain generator 20 made from metal.

Next, in the process illustrated in (b) of FIG. 10 an adhesive bond 41 is applied to the upper surfaces of the sub-columns 25a-25e and the upper surfaces of the protruding portions 27a-27d. For example, an epoxy-based adhesive may be used as the adhesive bond 41. It is preferable that the adhesive bond 41 have a Young's modulus of 1 GPa or more and a thickness of 20 μm or less from the viewpoint of the resistance to externally applied force.

Next, in the step illustrated in (a) of FIG. 11, a sensor chip 110 is made. The sensor chip 110 can be made, for example, by well-known methods of preparing an SOI substrate and etching the prepared substrate (e.g., reactive ion etching, etc.). Further, an electrode and/or wiring can be made by, for example, forming a metal film, such as aluminum, on the surface of the substrate by a sputtering method or the like, and then patterning the metal film by photolithography.

Next, in the process illustrated in (b) of FIG. 11, the sensor chip 110 is disposed within the strain generator 20 under pressure so that the lower surface of the sensor chip 110 is in contact with the adhesive bond 41 applied to the upper surface of the sub-columns 25a-25e and the upper surfaces of the protruding portions 27a-27d. The adhesive bond 41 is then heated to a predetermined temperature to cure. This secures the sensor chip 110 in the strain generator 20. Specifically, the supporting portions 111a-111d of the sensor chip 110 are secured on the sub-columns 25a-25e, the supporting portion 111e is secured on the sub-column 25e, and the force points 114a-114d are fixed onto the protruding portions 27a-27d, respectively.

Next, in the process illustrated in (a) of FIG. 12, an adhesive bond 42 is applied to the upper surfaces of the columns 22a-22d. For example, an epoxy-based adhesive may be used as the adhesive bond 42. The adhesive bond 42 is used to fix the input/output board 30 on the strain generator 20. Since no external force is applied to the adhesive bond 42, a general-purpose adhesive bond can be used.

Next, in the process illustrated in (b) of FIG. 12, the input/output board 30, on which the active components 32-35 and passive component 39 are mounted, is prepared and disposed on the strain generator 20 so that the lower surface of the input/output board 30 is in contact with the adhesive bond 42 applied to the upper surfaces of the columns 22a-22d. Then, the input/output board 30 is pressed on the side of the strain generator 20 while the adhesive bond 42 is heated to a predetermined temperature to cure. Thus, the input/output board 30 is fixed to the strain generator 20.

The input/output board 30 is fixed to the strain generator 20 to outwardly expose the sensor chip 110 and the input portions 24a-24d. Each electrode 31 of the input/output board 30 is preferably disposed on the columns 22a-22d of the strain generator 20 with the least strain when force is applied to the input portions 24a-24d.

Thereafter, a portion of the input/output board 30 that extends horizontally from the strain generator 20 (excluding the input terminal side) is bent toward each side surface side of the strain generator 20. The corresponding portions of the input/output board 30 and the sensor chip 110 are electrically connected to each other by a bonding wire or the like (not illustrated). With this, the force sensor device 1 is completed.

As described above, since the force sensor device 1 can be made of only the three components, namely, the sensor chip 110, the strain generator 20, and the input/output board 30, it is easy to assemble and the number of position registering portions can be minimized, so that the deterioration in accuracy caused by the mounting can be suppressed.

In addition, in the strain generator 20, since all the connecting points (the upper surfaces of the sub-columns 25a-25e and the upper surfaces of the protruding portions 27a-27d) with the sensor chip 110 are in the flat plane, the positional registration of the sensor chip 110 relative to the strain generator 20 is sufficient to be only one time, and mounting of the sensor chip 110 onto the strain generator 20 is easy.

Figure 13:
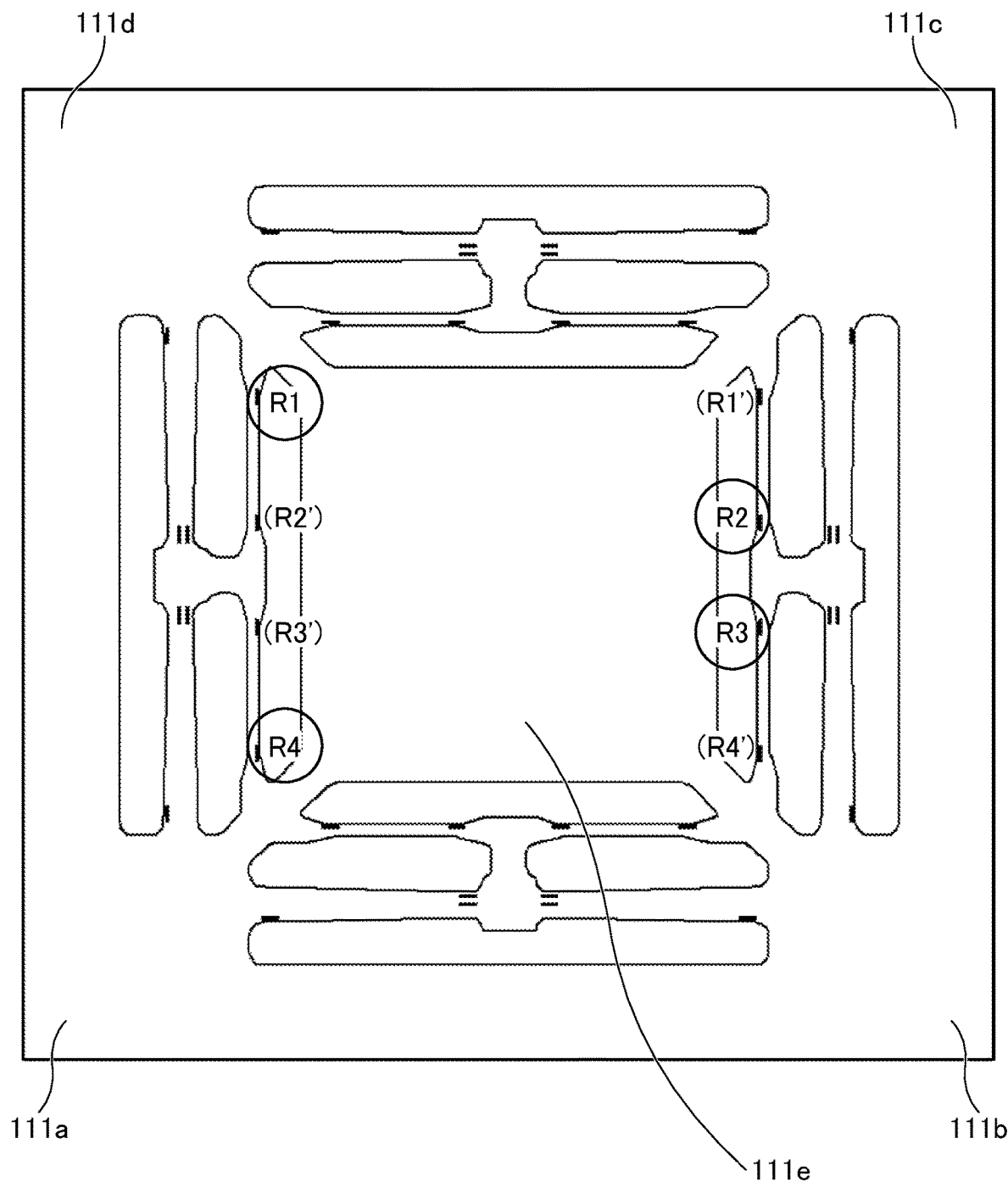
FIG. 13 illustrates an arrangement of piezoresistive elements for detecting force in the Fz direction of another example of the sensor chip according to the embodiment.

FIG. 13 illustrates the arrangement of piezoresistive elements for detecting the Fz direction force of another example of the sensor chip according to this embodiment. The sensor chips illustrated in FIGS. 3 and 6 differ in the shapes of the detecting beams 113a, 113d, 113g, and 113j and the detecting beams 113b, 113e, 113h, and 113k, but eight piezoresistive elements related to Fz are provided in a manner similar to the sensor chips illustrated in FIGS. 3 and 6.

In the sensor chip of FIG. 13, the piezoresistive elements FzR2 and FzR3 are disposed at a position that is on a side of the supporting portion 111e relative to a line that bisects the detecting beam 113e and is symmetric with respect to a line that bisects the detecting beam 113f in its longitudinal direction in a region close to the detecting beam 113f of the detecting beam 113e. The piezoresistive elements FzR1' and FzR4' are disposed at a position that is on the side of the supporting portion 111e relative to a line bisecting the detecting beam 113e in its longitudinal direction and is symmetric with respect to the line bisecting the detecting beam 113f in its longitudinal direction in regions far from the detecting beam 113f of the detecting beam 113e. The piezoresistive elements FzR1 and FzR4 are disposed at a position that is on the side of the supporting portion 111e relative to a line bisecting the detecting beam 113k in its longitudinal direction and is symmetric with respect to the line bisecting the detecting beam 113l in its longitudinal direction in regions far from the detecting beam 113l of the detecting beam 113k. The piezoresistive elements FzR2' and FzR3' are disposed at a position that is on a side of the supporting portion 111e relative to a line that bisects the detecting beam 113k and is symmetric with respect to a line that bisects the detecting beam 113l in its longitudinal direction in a region close to the detecting beam 113l of the detecting beam 113k.

The sensor chip illustrated in FIG. 13 includes a first detecting portion (R1, R2, R3, and R4) having four strain detecting elements capable of detecting force in a first direction being the Fz direction, and a second detecting portion (R1', R2', R3', and R4') having four strain detecting elements capable of detecting force in the first direction and provided at a position symmetric with respect to the first detecting portion. For example, the first detecting portion (R1, R2, R3, and R4) and the second detecting portion (R1', R2', R3', and R4') pass through the center of the substrate and are provided at a position symmetric with respect to a line parallel to the Y-axis. Alternatively, the first detecting portion (R1, R2, R3, and R4) and the second detecting portion (R1', R2', R3', and R4') are provided at a position rotation-symmetric with respect to the rotation around the Z-axis by 180 degrees.

In the sensor chip described above, an axis separation property can be improved because of the increased number of the piezoresistive elements and the symmetric arrangement of the piezoresistive elements in addition to the increased accuracy of the sensor.

Figure 14:
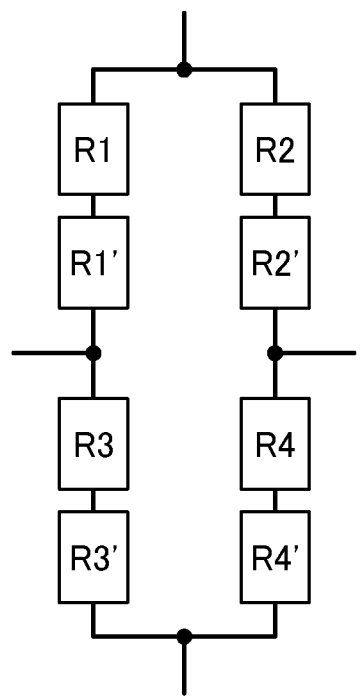
FIG. 14 illustrates a bridge circuit formed by piezoresistive elements that detect force in Fz or Mz direction of the sensor chip according to the embodiment.

FIG. 14 illustrates a bridge circuit by a piezoresistive element that detects force in the Fz or Mz direction of the sensor chip according to the embodiment. When the first detecting portion (R1, R2, R3, R4) and the second detecting portion (R1', R2', R3', R4') are provided, the bridge circuit is formed from a first resistance portion formed by connecting R1 and R1' in series, a second resistance portion formed by connecting R2 and R2' in series, a third resistance portion formed by connecting R3 and R3' in series, and a fourth resistance portion formed by connecting R4 and R4' in series.

Figure 15:
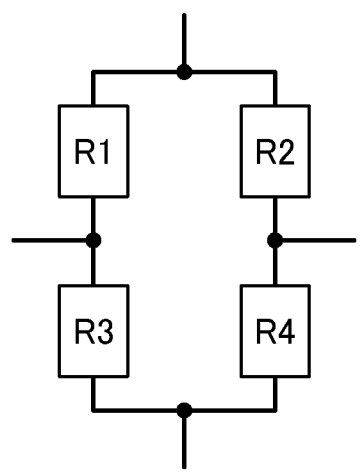
FIG. 15 is a diagram illustrating a bridge circuit formed by the piezoresistive elements that detect force in the Fz direction of the sensor chip according to a reference example.

FIG. 15 illustrates the bridge circuit using the piezoresistive element for detecting force in the Fz or Mz direction of the sensor chip in accordance with a reference example. The second detecting portion is not provided, and the bridge circuit is formed only by the first detecting portion (R1, R2, R3, and R4). The arrangement of the first detecting portion (R1, R2, R3, and R4) are asymmetric, and the axial separation property is not preferable.

Figure 16:
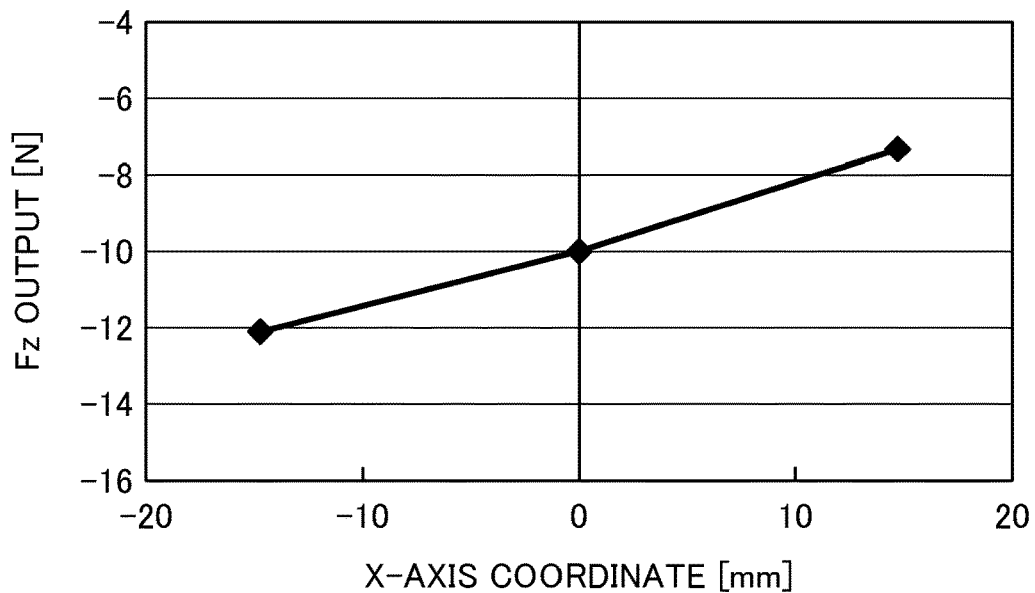
FIG. 16 is a graph explaining a simulation of another axis component for the structure of a reference example.

FIG. 16 illustrates a simulation of another axis component of the reference example in which the Fz output is calculated by using only the first detecting portion (R1, R2, R3, and R4) without using the second detecting portion (R1', R2', R3', and R4') in the sensor chip illustrated in FIG. 13. The force of −10N was applied in the Z-axis direction at three locations, where the X-axis coordinates were −15 mm, 0 mm, and +15 mm, and the Fz output at that time was calculated by using a simulation. At the position where the X-axis coordinate is 0 mm, the Fz output is approximately −10 N, but at the positions where the X-axis coordinate is −15 mm and +15 mm, the Fz output is around −12 N and −8 N, respectively, and when only the first detecting portion (R1, R2, R3, and R4) is used, it was confirmed that axis separation in the Fz direction is insufficient.

Figure 17:
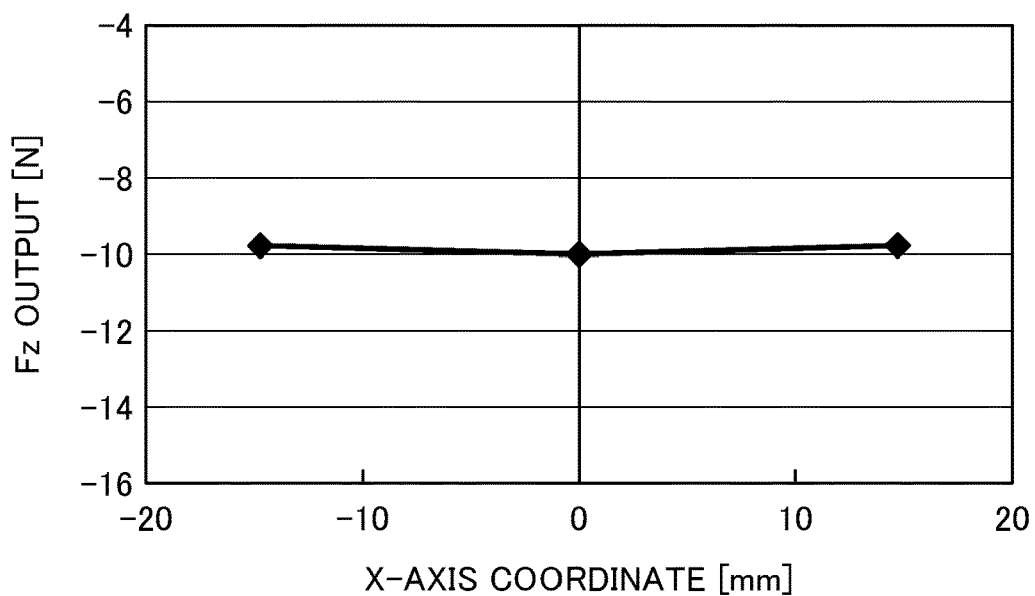
FIG. 17 is a graph explaining a simulation of another axis component for the structure of the embodiment.

FIG. 17 illustrates a simulation of the other axis component according to the embodiment, in which the Fz output is calculated using the first detecting portion (R1, R2, R3, and R4) and the second detecting portion (R1', R2', R3', and R4') in the sensor chip illustrated in FIG. 13. The force of −10N was applied in the Z-axis direction at three locations, where the X-axis coordinates were −15 mm, 0 mm, and +15 mm, and the Fz output at that time was calculated by simulation. The Fz output was approximately −10N at all three locations of which the X-axis coordinates were −15 mm, 0 mm, and +15 mm. It was confirmed that using the second detecting portion (R1', R2', R3', and R4'), which is symmetrically arranged relative to the first detecting portion (R1, R2, R3, and R4), improves axial separation in the Fz direction and improves the accuracy of the sensor.

Although the preferred embodiments have been described in detail above, various modifications and substitutions can be made to the embodiments described above without departing from the scope of the appended claims.

This application claims priority to Japanese Patent Application No. 2018-012923, filed with the Japan Patent Office on Jan. 29, 2018, the entirety of which is incorporated herein by reference.

EXPLANATION OF REFERENCE SYMBOLS

1: Force sensor device
20: Strain generator
21: Base
22a-22d, 25a-25d, 28: Column
23a-23d and 26a-26d: Beam
24a-24d: Input portion
27a-27d: Protruding portion
30; I/O board
31: Electrode
32-35: Active component
39: Passive component
40: Force receiving plate
40x, 40z: Recess
40y: Through hole
41, 42: Adhesive bond
110: Sensor chip
111a-111e: Supporting portion
112a-112h: Reinforcing beam
113a-113l: Detecting beam
114a-114d: Force point
FzR1-FzR4, FzR1'-FzR4, MzR1'-MzR4, MzR1'-MzR4, FxR1-FxR4, FyR1-FyR4, MxR1-MxR4, MyR1-MyR4: Piezoresistive element

The invention claimed is:

1. A sensor chip comprising:
   a substrate;
   first supporting portions;
   a second supporting portion around which the first support portions are disposed, the second supporting portion being disposed at a center of the substrate;
   first detecting beams each connecting the first supporting portions, which are mutually adjacent;
   second detecting beams disposed in parallel with the first detecting beams between the first detecting beams and the second supporting portion;
   force points disposed in the first detecting beams so as to be applied with force; and
   a plurality of strain detecting elements disposed a predetermined positions of the first detecting beams and the second detecting beams, wherein
   the plurality of strain detecting elements includes a first detecting portion having a strain detecting element capable of detecting force in a first direction, and a second detecting portion having a strain detecting element disposed at a position symmetric relative to the first detecting portion.

2. The sensor chip according to claim 1, the sensor chip further comprising:
   third detecting beams connecting the first detecting beams and the second detecting beams in each set, in which one of the first detecting beams and the corresponding second detecting beam are arranged in parallel, wherein
   the force point is arranged at an intersection between each of the first detecting beams and the corresponding third detecting beam.

3. The sensor chip according to claim 1, wherein
   a portion of the first detecting portion and a portion of the second detecting portion are formed in one of the second detecting beams, and
   a remainder of the first detecting portion and a remainder of the second detecting portion are formed in another one of the second detecting beams disposed in parallel with the one of the second detecting beams.

4. The sensor chip according to claim 3, wherein
   when a thickness direction of the substrate is in a Z-axis direction, a first direction is the Z-axis direction, and
   the first detecting portion and the second detecting portion are disposed at a position line-symmetric with respect to a line passing through the center of the substrate and perpendicular to the Z-axis.

5. The sensor chip according to claim 3, wherein
   when a thickness direction of the substrate is in a Z-axis direction, a first direction is the Z-axis direction, and
   the first detecting portion and the second detecting portion are disposed at a position rotation-symmetric with respect to a rotation around the Z-axis by 180 degrees.

6. The sensor chip according to claim 1, wherein
   the first detecting portions are formed in a pair of the first detecting beams which are mutually parallel, and
   the second detecting portion is formed in another pair of the first detecting beams perpendicular to the pair of the first detecting beams.

7. The sensor chip according to claim 6, wherein
   when a thickness direction of the substrate is in a Z-axis direction, a first direction is a direction of rotating around a Z-axis, and
   the first detecting portion and the second detecting portion are disposed at a position rotation-symmetric with respect to a rotation around the Z-axis by 90 degrees.

8. The sensor chip according to claim 1, wherein
   resistance values of the strain detecting elements of the first strain detecting portion and the second detecting portion is half a resistance value of the strain detecting element of other than the first detecting portion and the second detecting portion.

9. The sensor chip according to claim 1, wherein
   a sum of a number of the strain detecting elements of the first detecting portion and the second detecting portion is a multiple of the number of strain detecting elements detecting force in a direction different from the first direction.

10. The sensor chip according to claim 1, further comprising:
    a first reinforcing beam disposed in parallel with the first detecting beam on an outside of the first detecting beam and connecting the adjacent first supporting portions with each other; and
    a second reinforcing beam connecting the first supporting portions with the second supporting portion, wherein
    the second reinforcing beam is disposed in non-parallel with the first reinforcing beam, the first and second reinforcing beams are formed to be thicker than the first and second detecting beams, and
    the second detecting beams connects ends the second reinforcing beam and an end of an adjacent second reinforcing beam, the ends being present on a side of the second supporting portion.

11. A force sensor device comprising:
    the sensor chip according to claim 1; and
    a strain generator that transmits applied force to the sensor chip.

* * * * *